US007487170B2

(12) United States Patent  
Stevens

(10) Patent No.: US 7,487,170 B2
(45) Date of Patent: Feb. 3, 2009

(54) LOCATION INFORMATION FOR AVOIDING UNWANTED COMMUNICATIONS SYSTEMS AND METHODS

(75) Inventor: Gilman R. Stevens, Fairview, TX (US)

(73) Assignee: Qwest Communications International Inc., Denver, CO (US)

( * ) Notice: Subject to any disclaimer, the term of this patent is extended or adjusted under 35 U.S.C. 154(b) by 545 days.

(21) Appl. No.: 11/219,283

(22) Filed: Sep. 2, 2005

(65) Prior Publication Data
US 2007/0055732 A1 Mar. 8, 2007

(51) Int. Cl.
G06F 17/30 (2006.01)
(52) U.S. Cl. .................. 707/101; 707/10; 709/203
(58) Field of Classification Search ........... 707/10, 707/100, 1, 9, 101, 206; 709/203
See application file for complete search history.

(56) References Cited

U.S. PATENT DOCUMENTS

| 6,493,007 | B1 * | 12/2002 | Pang ..................... 715/835 |
| 6,671,351 | B2 | 12/2003 | Menard et al. |
| 7,155,484 | B2 * | 12/2006 | Malik .................... 709/206 |
| 7,272,853 | B2 * | 9/2007 | Goodman et al. ......... 726/13 |
| 7,275,082 | B2 * | 9/2007 | Pang ..................... 709/206 |
| 2003/0109245 | A1 | 6/2003 | McCalmont et al. |
| 2004/0181581 | A1 * | 9/2004 | Kosco ................... 709/206 |
| 2004/0203903 | A1 | 10/2004 | Wilson et al. |
| 2006/0212520 | A1 * | 9/2006 | Logue et al. ............ 709/206 |

OTHER PUBLICATIONS

U.S. Appl. No. 11/219,242, Office Action dated Dec. 21, 2007, 15 pages.

* cited by examiner

Primary Examiner—Cheryl Lewis
(74) Attorney, Agent, or Firm—Townsend and Townsend and Crew LLP

(57) ABSTRACT

Systems, methods, and software for identifying location based rules related to a network connected device are described. A network connected device may transmit a set of data identifying the location of the device and an identifier unique to the device to a server. The server may also receive an action request, wherein the action request is associated with the identifier. The server may select a rule in a database to address the action request, the rule applicable to the identifier and location of the device. Various embodiments related to financial card transactions, access to financial information, emergency services contact, and electronic message filtering are also addressed.

24 Claims, 24 Drawing Sheets

| | | 830 | 832 | 834 | 836 | 838 | 840 |
|---|---|---|---|---|---|---|---|
| Device$_1$ | ID$_1$ | User Information(Medical Conditions)$_{1A}$ | GeographicRegion$_{1Ai}$ | ←Compare→ | CurrLoc$_1$ |
| | | User Information(HomeFloorplan)$_{1B}$ | GeographicRegion$_{1B}$ | ←Compare→ | " |
| | | User Information(WorkFloorplan)$_{1C}$ | GeographicRegion$_{1C}$ | ←Compare→ | " |
| | | User Information(ContactInformation)$_{1D}$ | GeographicRegion$_{1D}$ | ←Compare→ | " |
| Device$_2$ | ID$_2$ | User Information(Medical Conditions)$_{2A}$ | GeographicRegion$_{2A}$ | ←Compare→ | CurrLoc$_2$ |
| | | User Information(HomeFloorplan)$_{2B}$ | GeographicRegion$_{2B}$ | ←Compare→ | " |
| | | User Information(ContactInformation)$_{2C}$ | GeographicRegion$_{2C}$ | ←Compare→ | " |
| Device$_3$ | ID$_3$ | User Information(Medical Conditions)$_{3A}$ | GeographicRegion$_{3A}$ | ←Compare→ | CurrLoc$_3$ |
| | | User Information(HomeFloorplan)$_{3B}$ | GeographicRegion$_{3B}$ | ←Compare→ | " |
| | | User Information(Doctor)$_{3D}$ | GeographicRegion$_{3C}$ | ←Compare→ | " |
| Device$_4$ | ID$_4$ | User Information(Medical Conditions)$_{4A}$ | GeographicRegion$_{4A}$ | ←Compare→ | CurrLoc$_4$ |
| | | User Information(Prescriptions)$_{4B}$ | GeographicRegion$_{4B}$ | ←Compare→ | " |
| | | User Information(WorkFloorplan)$_{4C}$ | GeographicRegion$_{4C}$ | ←Compare→ | " |

| 930 | 932 | 934 | 936 | 938 | 940 |
|---|---|---|---|---|---|
| Receiver₁ | DeliveryRequest₁ | Rule(Deliver)₁ᵢ | GeographicRegion₁ᵢ | ←Compare→ | SenderLocation₁ |
| | | Rule(Block)₁ᵢᵢ | GeographicRegion₁ᵢᵢ | ←Compare→ | " |
| | | Rule(MoreInfo)₁ᵢᵢᵢ | GeographicRegion₁ᵢᵢᵢ | ←Compare→ | " |
| Receiver₂ | DeliveryRequest₂ | Rule(Deliver)₂ᵢ | GeographicRegion₂ᵢ | ←Compare→ | SenderLocation₂ |
| | | Rule(Block)₂ᵢᵢ | GeographicRegion₂ᵢᵢ | ←Compare→ | " |
| | | Rule(MoreInfo)2ᵢᵢᵢ | GeographicRegion₂ᵢᵢᵢ | ←Compare→ | " |
| | | Rule(RequireReg)₂ᵢᵥ | GeographicRegion₂ᵢᵥ | ←Compare→ | " |
| Receiver₃ | DeliveryRequest₃ | Rule(Deliver)₃ᵢ | GeographicRegion ₃ᵢ | ←Compare→ | SenderLocation₃ |
| | | Rule(Block)₃ᵢᵢ | GeographicRegion ₃ᵢᵢ | ←Compare→ | " |
| Receiver₄ | DeliveryRequest₄ | Rule(Deliver)₄ᵢ | GeographicRegion ₄ᵢ | ←Compare→ | SenderLocation₄ |
| | | Rule(Block)4ᵢᵢ | GeographicRegion ₄ᵢᵢ | ←Compare→ | " |
| | | Rule(MoreInfo)₄ᵢᵢᵢ | GeographicRegion ₄ᵢᵢᵢ | ←Compare→ | " |
| | | Rule(RequireReg)₄ᵢᵥ | GeographicRegion ₄ᵢᵥ | ←Compare→ | " |
| | | Rule(AskReceiver)₄ᵥ | GeographicRegion ₄ᵥ | ←Compare→ | " |

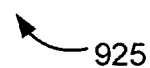

| | 976 | 978 | 980 | 982 | 984 | 986 |
|---|---|---|---|---|---|---|
| | $Receiver_1$ | $DeliveryRequest_{1A}$ | $Rule(Deliver)_{1A\,i}$ | $GeographicRegion_{1A\,i}$ | ←Compare→ | $SenderLocation_{1A}$ |
| | | | $Rule(Block)_{1A\,ii}$ | $GeographicRegion_{1A\,ii}$ | ←Compare→ | " |
| | | | $Rule(MoreInfo)_{1A\,iii}$ | $GeographicRegion_{1A\,iii}$ | ←Compare→ | " |
| | | $DeliveryRequest_{1B}$ | $Rule(Deliver)_{1B\,i}$ | $GeographicRegion_{1B\,i}$ | ←Compare→ | $SenderLocation_{1B}$ |
| | | | $Rule(Block)_{1B\,ii}$ | $GeographicRegion_{1B\,ii}$ | ←Compare→ | " |
| | $Receiver_2$ | $DeliveryRequest_{2A}$ | $Rule(Deliver)_{2A\,i}$ | $GeographicRegion_{2A\,i}$ | ←Compare→ | $SenderLocation_{2A}$ |
| | | | $Rule(Block)_{2A\,ii}$ | $GeographicRegion_{2A\,ii}$ | ←Compare→ | " |
| | | | $Rule(MoreInfo)_{2A\,iii}$ | $GeographicRegion_{2A\,iii}$ | ←Compare→ | " |
| | | $DeliveryRequest_{2B}$ | $Rule(Deliver)_{2B\,i}$ | $GeographicRegion_{2B\,i}$ | ←Compare→ | $SenderLocation_{2B}$ |
| | | | $Rule(Block)_{2B\,ii}$ | $GeographicRegion_{2B\,ii}$ | ←Compare→ | " |
| | | | $Rule(MoreInfo)_{2B\,iii}$ | $GeographicRegion_{2B\,iii}$ | ←Compare→ | " |
| | | | $Rule(RequireReg)_{2B\,iv}$ | $GeographicRegion_{2B\,iv}$ | ←Compare→ | " |
| | $Receiver_3$ | $DeliveryRequest_{3A}$ | $Rule(Deliver)_{3A\,i}$ | $GeographicRegion_{3A\,i}$ | ←Compare→ | $SenderLocation_{3A}$ |
| | | | $Rule(Block)_{3A\,ii}$ | $GeographicRegion_{3A\,ii}$ | ←Compare→ | " |
| | | | $Rule(MoreInfo)_{3A\,iii}$ | $GeographicRegion_{3A\,iii}$ | ←Compare→ | " |
| | $Receiver_4$ | $DeliveryRequest_{4A}$ | $Rule(Deliver)_{4A\,i}$ | $GeographicRegion_{4A\,i}$ | ←Compare→ | $SenderLocation_{4A}$ |
| | | | $Rule(Block)_{4A\,ii}$ | $GeographicRegion_{4A\,ii}$ | ←Compare→ | " |
| | | | $Rule(MoreInfo)_{4A\,iii}$ | $GeographicRegion_{4A\,iii}$ | ←Compare→ | " |
| | | | $Rule(RequireReg)_{4A\,iv}$ | $GeographicRegion_{4A\,iv}$ | ←Compare→ | " |
| | | | $Rule(AskReceiver)_{4A\,v}$ | $GeographicRegion_{4A\,v}$ | ←Compare→ | " |
| | | $DeliveryRequest_{4B}$ | $Rule(Deliver)_{4B\,i}$ | $GeographicRegion_{4B\,i}$ | ←Compare→ | $SenderLocation_{4B}$ |
| | | | $Rule(Block)_{4B\,ii}$ | $GeographicRegion_{4B\,ii}$ | ←Compare→ | " |
| | | | $Rule(MoreInfo)_{4B\,iii}$ | $GeographicRegion_{4B\,iii}$ | ←Compare→ | " |
| | | $DeliveryRequest_{4C}$ | $Rule(Deliver)_{4C\,i}$ | $GeographicRegion_{4C\,i}$ | ←Compare→ | $SenderLocation_{4C}$ |
| | | | $Rule(Block)_{4C\,ii}$ | $GeographicRegion_{4C\,ii}$ | ←Compare→ | " |
| | | | $Rule(MoreInfo)_{4C\,iii}$ | $GeographicRegion_{4C\,iii}$ | ←Compare→ | " |

FIG. 9D

LOCATION INFORMATION FOR AVOIDING UNWANTED COMMUNICATIONS SYSTEMS AND METHODS

CROSS-REFERENCES TO RELATED APPLICATIONS

This application is related to the following U.S. Patent Applications, the entire disclosures of which are hereby incorporated by reference: U.S. application Ser. No. 11/219,082, filed on a date even herewith by Stevens, entitled "Location Based Rules Architecture Systems and Methods"; U.S. application Ser. No. 11/219,219, filed on a date even herewith by Stevens, entitled "Location Based Authorization of Financial Card Transactions Systems and Methods"; U.S. application Ser. No. 11/219,255, filed on a date even herewith by Stevens, entitled "Location Based Access to Financial Information Systems and Methods"; and U.S. application Ser. No. 11/219,242, filed on a date even herewith by Stevens, entitled "Location Based Information for Emergency Services Systems and Methods".

BACKGROUND OF THE INVENTION

The present invention relates generally to electronic communications, and more specifically to the use of location based information in communications networks.

GPS receivers and other location determination technology have advanced rapidly over the past few years. In addition, the chipsets associated with this location technology have gotten much smaller and less costly, with stamp size receivers becoming far more common. Certain applications for this location based information are only now becoming possible and, thus, leveraging the size and cost improvements is only in the nascent stages. Communication networks, relational databases and computer systems represent other areas that have also seen significant advancement in speed, price, and size. There are considerable opportunities for integration of location determination technology with these different systems to provide new functionality.

There are a variety of problems for which location verification technology could be used which may not be apparent at first glance. For example, credit and other financial card fraud is a significant problem. Many attempts have been made to address these issues, with varying degrees of success. However, with the rise of the Internet and the improvements in communication, new fraud schemes are being created and evolving. Often, the financial card information is fraudulently used for a transaction at a different place than the physical location of the legitimate card holder. There is, thus, need in the art to better leverage location based technology to verify users and authorize transactions of such financial cards.

Phishing is another fraud currently on the rise. Phishing is the act of sending an e-mail to a user, wherein the sender falsely claims to be a financial company or other organization. The e-mail directs the user to visit a website where he or she is asked to update personal information, such as passwords, account numbers, credit cards, and social security numbers, that the legitimate organization already has. The website, however, is merely set up to defraud the unwary visitor into surrendering private information. Often, the personal information is fraudulently used at a different location than the legitimate user. There is, thus, need in the art to better leverage location based technology to verify and authenticate potential victims of Phishing and other such fraud schemes.

As mobile communication devices have proliferated, issues related to the reporting and request of emergency services have grown. A Public Safety Answering Point ("PSAP") is an entity authorized to receive and respond to emergency calls in a local area. As mobile telephone service expanded, the difficulty with routing calls to the proper PSAP became a bigger issue. Enhanced 911 (E911) provides the ability to selectively route calls to the proper PSAP based on the location of a caller. This is accomplished through the use of an Automatic Location Identification ("ALI") database. However, as the number and variety of data communication devices have multiplied, there is an increasing need in the art to leverage location based technology to provide improved information and service to both emergency providers and users.

The Internet has spawned an exponential increase in electronic communications, but with this change there has also been a significant growth in unwanted communications. SPAM (mass e-mail), SPIM (mass electronic messaging), and SPIT (mass Internet telephony) are prime examples of such unwanted communications. One reason for the proliferation of such unsolicited messages is the anonymity associated with electronic communications. This problem is exacerbated by the fact that the location of the sender is often unknown. There is, thus, a need in the art to leverage location based technology to verify the originating location of certain senders to limit such unwanted communications.

BRIEF SUMMARY OF THE INVENTION

Various embodiments of the invention provide systems, methods and software for identifying location based rules related to a network connected device. According to some embodiments, a network connected device receives a set of data identifying the location of the device, such as GPS coordinates. According to various embodiments, the set of data may be received by hardware. In different embodiments, hardware may be integrated into, or detachable from, the device. The network connected device may then transmit, in a communications signal, the set of location data and an identifier unique to the device to a location comparison server. In alternative embodiments, the identifier may comprise a MAC address, or an IP address. An identifier may also be associated with a specific user. The server is in communication with the device and a database, and in some embodiments the server may comprise the database.

The database may comprise a table of identifiers, each identifier in the table unique to one of any number of electronic devices. According to some embodiments, the table includes the identifier unique to the network connected device. The database also may include a number of rules dictating how an action request to be performed by a server shall be performed. In various embodiments, the rules are applicable only to a subset of the identifiers in the table. The table may also include a plurality of geographic regions. In some embodiments, each geographic region is associated with a rule, wherein the applicability of each rule is limited to the geographic region associated with that rule. The geographic regions may be variable. In some embodiments, the database may store the set of location data. In still other embodiments, the table may include associated account numbers, credit card numbers, financial information, or user information.

The server may be configured to receive an action request, wherein the action request is associated with the identifier unique to the device. An action request may be initiated by the user of the device, or another person or entity. In different embodiments, an action request may comprise a request to allow access to resources of the server, a request to validate a location, a request for the server to perform some other action (e.g, authentication, connection establishment, message forwarding, etc.), or any other server function or action described herein. According to some embodiments, the server may then process the action request according to the applicable rule. To identify the applicable rule, the server may correlate the action request to a rule associated with the action request which is applicable to the identifier unique to the device and the geographic region within which the device is located.

According to some embodiments, the action request is associated with a location from which the action request originated, and the geographic regions are dependent on or determined by the originating location. In one embodiment, a geographic region comprises an area within a specified distance of the originating location.

According to various embodiments, an action request may comprise a request to authorize a transaction (such as credit card transaction), a request to access information, a request for emergency services, or a request to filter an electronic message. Accordingly, in some embodiments, rules to address the action requests may comprise authorizing or denying a transaction, allowing or prohibiting access to information, forwarding a request for emergency services, or filtering an electronic message.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 8B represents an example of a table illustrating the relationship between certain factors that may be used in contacting emergency services according to various embodiments of the present invention.

FIG. 9B represents an example of a table illustrating the relationship between certain factors that may be used in filtering electronic messages according to various embodiments of the present invention.

FIG. 9D represents an example of a table illustrating the relationship between certain factors, including the location and identification of the sender, that may be used in filtering electronic messages according to various embodiments of the present invention.

DETAILED DESCRIPTION OF THE INVENTION

Figure 1:
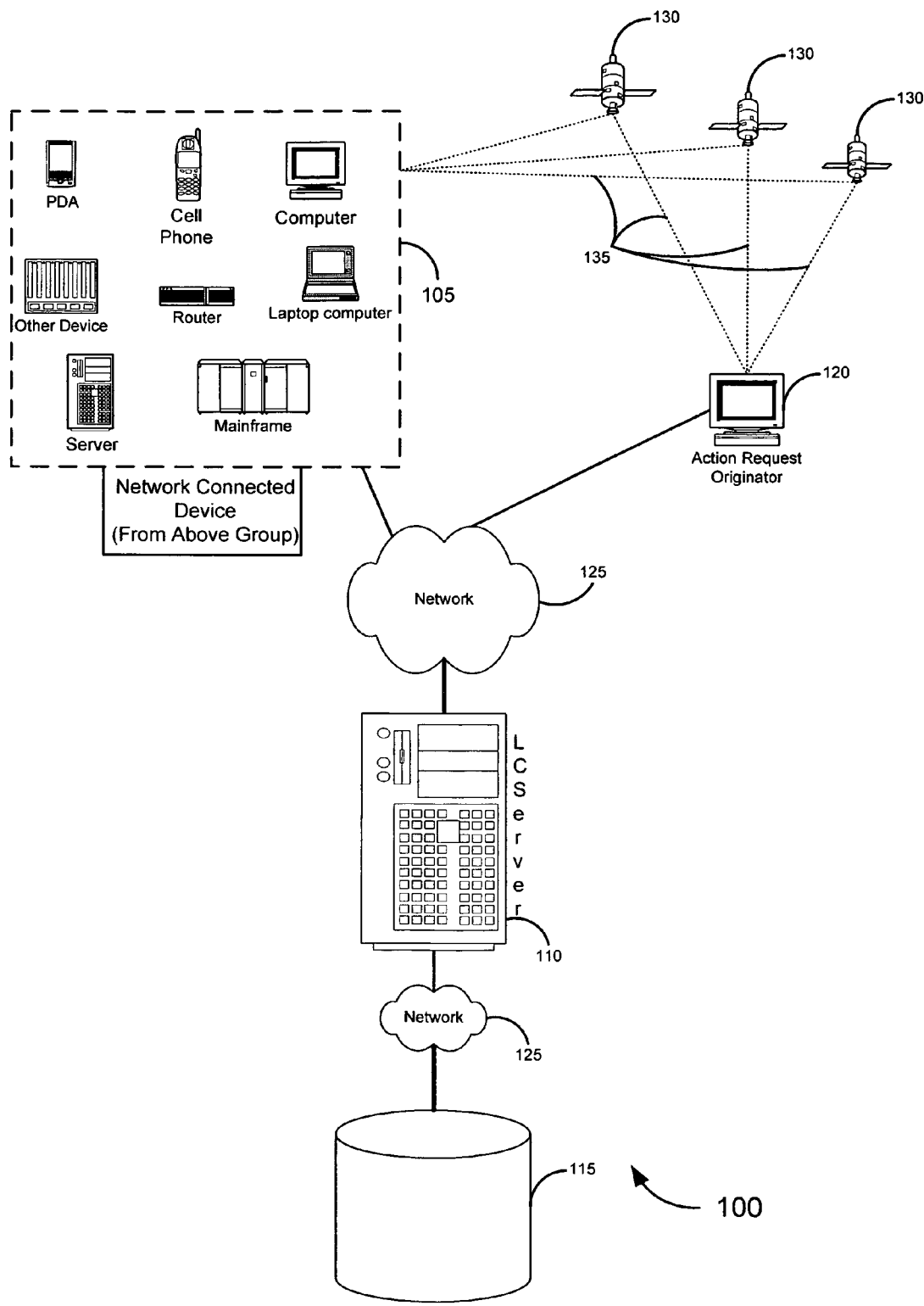
FIG. 1 illustrates a communications system that may be used to identify location based rules related to a network connected device according to various embodiments of the present invention.

This description provides exemplary embodiments only, and is not intended to limit the scope, applicability or configuration of the invention. Rather, the ensuing description of the embodiments will provide those skilled in the art with an enabling description for implementing embodiments of the invention. Various changes may be made in the function and arrangement of elements without departing from the spirit and scope of the invention as set forth in the appended claims.

Thus, various embodiments may omit, substitute, or add various procedures or components as appropriate. For instance, it should be appreciated that in alternative embodiments, the methods may be performed in an order different than that described, and that various steps may be added, omitted or combined. Also, features described with respect to certain embodiments may be combined in various other embodiments. Different aspects and elements of the embodiments may be combined in a similar manner.

It should also be appreciated that the following rules be a component of a larger system, wherein other rules may take precedence over or otherwise modify the application of the rules. Also, a number of steps may be required before the following rules are identified or applied. By way of example, with access to financial information, other preventative measures and authorizations (e.g., passwords, encryption, biometrics, etc.) may be used in conjunction with or apart from the rules providing for access to such financial information.

I. Overview: Various embodiments of the present invention provide novel solutions, including systems, methods, and software, for identifying location based rules related to a network connected device. According to some embodiments, a network connected device receives a set of data identifying the location of the device, such as GPS coordinates. The network connected device may then transmit, in a communications signal, the set of location data and an identifier unique to the device to a server. The server is in communication with the device and a database.

The database may comprise a table of identifiers, each identifier in the table unique to one of any number of electronic devices. According to some embodiments, the table includes the identifier unique to the network connected device. The database also may include a number of rules dictating how an action request to be performed by a server shall be performed. In various embodiments, the rules are applicable only to a subset of the identifiers in the table. The table may also include a plurality of geographic regions. In some embodiments, each geographic region is associated with a rule, wherein the applicability of each rule is limited to the geographic region associated with that rule.

The server may be configured to receive an action request, wherein the action request is associated with the identifier unique to the device. An action request may comprise a request to allow access to resources of the server, a request for the server to perform some other action (e.g., authentication, connection establishment, message forwarding, etc.), or any other server function or action described herein. According to some embodiments, the server may then process the action request according to the applicable rule. To identify the applicable rule, the server may correlate the action request to a rule associated with the action request which is applicable to the identifier unique to the device and the geographic region within which the device is located.

II. Broad System Architecture: FIG. 1 illustrates an example of a Communications System 100 within which various embodiments of the present invention may be included. The System 100 may be comprised of a Network Connected Device 105, Location Comparison Server 110 (or "Server 110" or "LC Server 110"), a Database 115, and an Action Request Originator 120.

The System 100 components may be directly connected, or may be connected via a Network 125, which may be any combination of the following: the Internet, an IP network, an intranet, a wide-area network ("WAN"), a local-area network ("LAN"), a virtual private network, the Public Switched Telephone Network ("PSTN"), or any other type of network supporting data communication between devices described herein, in different embodiments. The Network 125 may include both wired and wireless connections, including optical links. Many other examples are possible and apparent to those skilled in the art in light of this disclosure. In the discussion that follows, the Network 125 may or may not be noted specifically. If no specific means of connection is noted, it may be assumed that the link, communication or other connection between devices may be via a Network 125.

1. Network Connected Device: A Network Connected Device 105 may be comprised of any of the following examples of a network connected device: a server, a personal computer, a workstation, a web server, a mainframe, a router, a switch, an access point, a cellular phone, a VoIP phone, a personal digital assistant, a pager, a text messaging device, a laptop, a portable digital music player, a two way radio, any computing device, or other device that transmits data signals, or other signals that contain data. A Device 105 communicates with a Network 125 or any component thereof, and the connection of the Device 105 and Network 125 may be via any wired, wireless, or other connection.

The Device 105 may be configured to receive a set of data identifying the location of the Device 105. The Device 125 may be directly or indirectly coupled with a receiver component which enables the reception of location based information, also referred to herein as "set of data identifying the location" or "location based data." The location based information may be received by hardware configured to receive the set of data identifying the location of the device. The receiver may be coupled with the Mobile Communications Device 105 in any suitable manner known in the art. By way of example, it may be an integrated component or may be a stand alone receiver otherwise communicating with the Device 105. In some embodiments, the hardware may be removable from the device, and then coupled with another network connected device to provide similar functionality without reconfiguration of the hardware. An example of such a component is a GPS receiver communicatively coupled with the Device 105 with a USB connection. In other embodiments, the hardware configured to receive the set of data identifying the location of the Device 105 may comprise other GPS receiver configurations. Therefore, the location based information may comprise GPS coordinates. A receiver may, alternatively, comprise any other combination of hardware and software to achieve the functionality described above.

The location based information may be in the form of Satellite 130 location information, cellular location information, network analysis of location information, location information specific to a building, or other means for location determination. The location based information may be based on triangulation using cellular towers or access points. The location based information may be GPS coordinates or any other GPS related location information. Alternatively, cellular carriers may employ other means of locating cellular telephones and other mobile computing devices using cellular towers. By way of example, the time difference of arrival, angle of arrival, and location pattern matching methods are well known in the art as alternative means of obtaining location information. Additionally, any combination of the above may be used as well, and it is anticipated that location technologies will evolve and "set of data identifying the location of the device" is to be interpreted to include the reception of new forms of location based data.

According to various embodiments, a Device 105 transmits a communications signal which includes information comprising the set of data identifying the location of the Device 105, and an identifier unique to the Device 105. The identifier may comprise an IP address, a MAC address, a telephone number, a unique device number, or any number or other identifier unique to a device or which otherwise identifies a device. The Device 105, and identifier, may be associated with a user, a financial card number, a credit card number, an account number, or other numbers or accounts. A communications signal, as that term is used throughout the Application, may comprise any number of signals (i.e., the information may be sent in any number of different signals or packets). The number of signals may be sent at different times. The communications signal may be transmitted at different intervals. For example, the intervals may be related to a specific query by the Location Comparison Server 110, when each measurement takes place, or at the end of each call or other two-way communication session. The communications signal may also be transmitted at a regular, periodic interval (e.g. ping functionality, with transmission every minute or other set or variable interval). Alternatively, the measurements may be consolidated and transmitted at intervals to maximize power preservation on a mobile Device 105.

Generally, and as described below, the communications signal may be directed to the Location Comparison Server 110 and associated Database 115 (which each may be located in, or otherwise connected to, a Network 125) via one or more communications links. Each communications link may include any number of intermediate devices, including routers, switches, or other devices that receive and transmit communication signals. The communications signal may comprise an Internet Protocol ("IP") packet sent over the Network 125, a short message packet or signal sent over the Network 125, or comprise any other communications protocol. In some embodiments, the communications signal is transmitted via General Packet Radio Service ("GPRS"). In other embodiments, the communications signal may comprise a wireless signal to be transmitted via WiFi, WiMax, CDMA, UMTS, UWB, or any other wireless means. However, according to different embodiments, there are a variety of potential network configurations and protocols to carry the communications signals.

2. Rule/Location Database: A Device 105 is in communication with the Location Comparison Server 110, and associated Rule/Location Database 115 (hereinafter "Database 115"). The Database 115 may comprise one or more different databases, and one or more of such databases may be a relational database. According to different embodiments of the invention, the Database 115 may include any number of tables and sets of tables. In addition, any databases described below may be included in the Database 115. Application software running on the Location Comparison Server 110 queries the Database 115, and produces forms, reports, or other output as dictated by the application software. The Database 110 may be incorporated within the Location Comparison Server 110 (e.g., within its storage media), or may be a part of a separate system. The Database 115 may be fully located within a single facility or distributed geographically. The Database 110 may be organized in any manner different than described above to provide the functionality called for by the various embodiments, as known by those skilled in the art. The Database 115 contains information related to location information, authentication information, user profiles and preferences.

Figure 2:
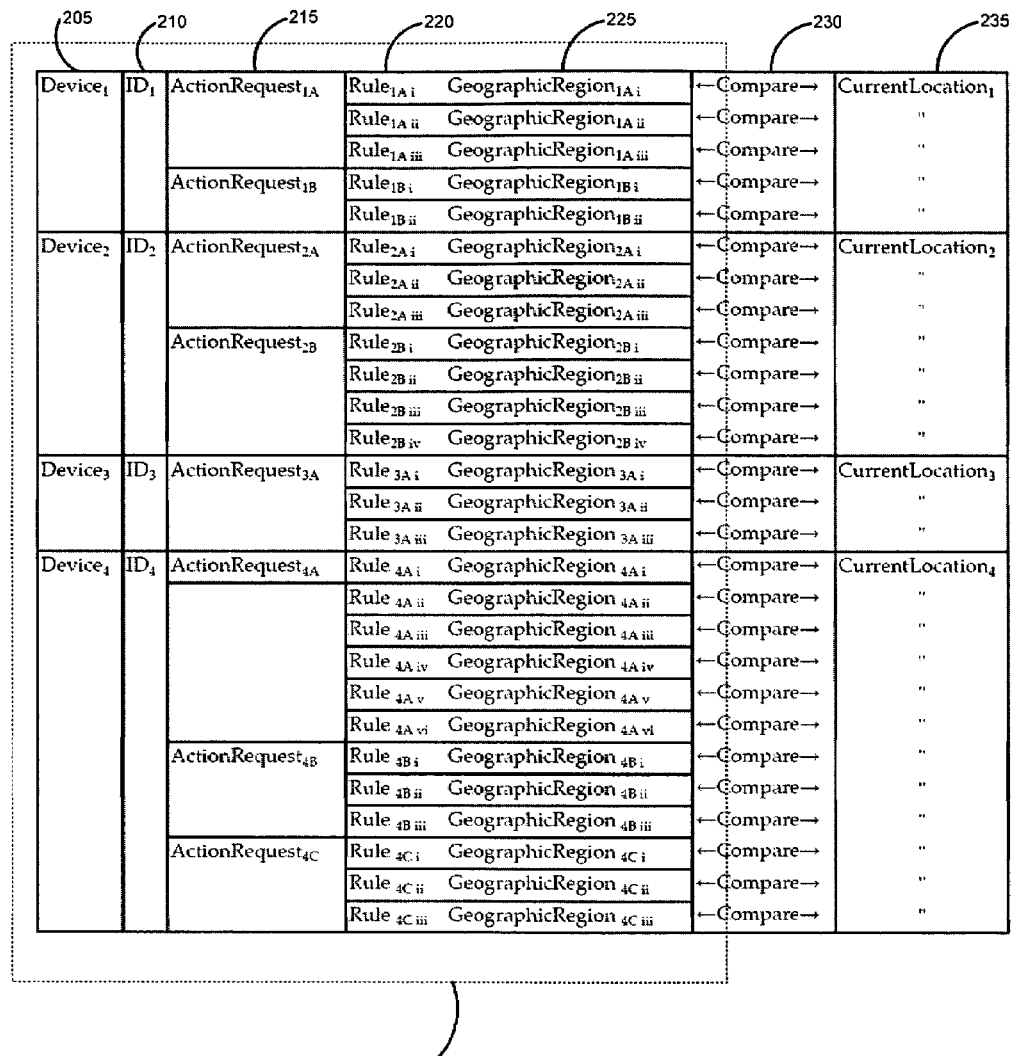
FIG. 2 represents an example of a table illustrating the relationship between certain factors that may be used to identify applicable location based rules related to a network connected device according to various embodiments of the present invention.

FIG. 2 shows a table 200 which is provided for exemplary purposes only, and illustrates how the Database 115 may be structured according to certain embodiments of the invention. The Database 115 may comprise a table 200 of identifiers 210, each identifier in the table unique to one of any number of network connected devices 205. In the Database 115, the Device 105 and identifier may also be associated with a user, a financial card number, a credit card number, an account number, or other numbers, accounts, information, or physical locations. The table 200 also may include a number of action requests 215 (i.e., ActionRequest$_{1A}$, ActionRequest$_{1B}$, ActionRequest$_{2A}$, ActionRequest$_{2B}$, ActionRequest$_{3A}$, etc.). The subscript number denotes the Device 105/identifier to which the action request is applicable, while the subscript capital letter denotes different action requests. Each action request 215 is subject to one or more rules 220 dictating how an action request to be performed by the Server 110 shall be performed (i.e., ActionRequest$_{1A}$ is subject to (Rule$_{1A\ i}$, Rule$_{1A\ ii}$, Rule$_{1A\ iii}$); ActionRequest$_{1B}$ is subject to (Rule$_{1B\ i}$, Rule$_{1B\ ii}$). The subscripts (i, ii, iii, etc) each denote different rules applicable to the specific action requests for each Device 105/identifier. In various embodiments, the rules are applicable only to a subset of the identifiers in the table.

The table may also include a plurality of geographic regions 225. In some embodiments, each geographic region 225 is associated with a rule 220, wherein the applicability of a rule 220 is limited to the geographic region 225 associated with that rule 220. The applicable geographic region 225 is determined by comparing 230 the location 235 of a device 205 to see if it is within a given geographic region. For a given device 205, the applicable rule 220 may be determined by correlating 230 a rule 220 applicable to an action request 215 with the geographic region 225 within which a device 205 is located 235. In some embodiments, the Database 115 contains the information categories specified by the dashed line area denoted by reference numeral 240. In other embodiments, the Database 115 may contain all the information categories specified.

3. Location Comparison Server 110: The Location Comparison Server 110 may process an action request according to rules in the Database 115. The Server 110 may include, for example, one or more server computers, personal computers, workstations, web servers, or other suitable computing devices. The Server 110 may be fully located within a single facility or distributed geographically, in which case a Network 125, as described above, may be used to integrate different components. A Location Comparison Server 110 may comprise any computing device configured to process, manage, complete, analyze, or otherwise address an action request, either directly or indirectly. Application software running on the Location Comparison Server 110 may receive an action request associated with an identifier, and query the database to identify the applicable rule associated with the action request given the location of the Device 105.

In various embodiments, the Location Comparison Server 110 includes application software comprising complex mapping and spatial analysis functionality in order to evaluate and compare various types of received location based data. Such mapping and spatial analysis tools are well known in the art. The functionality included in the tools may include the ability to formulate boundaries of geographic regions given certain rules governing their formation. Any number of inputs may dictate how such boundaries will be formed. Additional functionality may include the ability to determine whether certain devices are located within different regions based on a set of data identifying the location of the device. There are a variety of ways known in the art to create variable boundaries of geographic regions based on different input parameters. One skilled in the art will recognize how such tools may be utilized in various embodiments of the invention.

In some embodiments, a set of rules dictates the different ways in which an action request from a given device will be handled, with each rule dependent on the geographic region in which a Device 105 is located. Each rule may apply to one, or more, Device 105, and thus one, or more, unique identifiers. Each rule may be applicable in only specified geographic regions. A rule may relate to one action request from a device located in a specific region, or a rule may apply to other action requests from other devices. A better understanding of the embodiments of the system may be gained with further discussion of action requests, rules, and associated geographic regions.

4. Action Request↔Rule/Geographic Region: An action request relates to any action, access, privilege, right, rule, or other resource that may be provided by a server, such as the Location Comparison Server 110. By way of example, an action request may comprise a request to allow access to resources of the server, a request for a password, a request for validation or authorization, or a request to establish a communication connection. An action request may originate from any network connected device or other computing device which communicates with a Network 125. For ease in discussion, such a device will be termed an "Action Request Originator 120." An Action Request Originator 120 includes any such device which transmits or otherwise initiates an action request. More specific examples of such action requests may include, without limitation: a request to authorize a transaction for a credit card, financial card or other financial account number; a request to access information (financial, personal, or other) for or related to an account number; a request to contact or otherwise establish a communication connection; a request to deliver, forward or filter an electronic message; or a request to validate the location of a user or transaction.

According to various embodiments, an Action Request Originator 120 transmits an action request and an identifier associated with a Device 105 via one or more communication signals. The communications signals from the Action Request Originator 120 may be transmitted in the same manner described above relating to transmissions from the Device 105. The transmissions may be sent over a Network 125, and directed to the Location Comparison Server 110. One purpose of the inclusion of the identifier may be to link an action request to a Device 105. This may be of importance because an action request may be initiated from a Device 105, or may be initiated from another source. Thus, an Action Request Originator 105 need not comprise the Device 105, but there may be value in connecting the action request to the Device 105 via the identifier. An action request may be initiated by the user of a Device 105 associated with the identifier, or may be made by a person or entity other than the user of the Device 105. An action request may be specific, or implied.

A rule relates to how an action request tied to an identifier (and, thus, the associated Device 105 as well) will be addressed. For example, whereas an action request may comprise a request to allow access to resources of the server, a rule may comprise granting, denying, or requiring additional information for the request for access. In some embodiments, a rule is associated with specific geographic regions, wherein the specific rule to be applied (i.e., granting, denying, or requiring additional information for the request for access) is based on the geographic region within which the Device 105 associated with the identifier is located.

For purposes of example, and without limitation: for an action request to access information; the rules may comprise grant, deny, or require additional information; for an action request to deliver an e-mail; filtering rules may comprise deliver e-mail, return e-mail, or require registration; for an action request to validate the location of a Device 105; the rules may comprise validate, invalidate, or unknown. There are numerous other examples which are readily apparent to one skilled in the art. The rules may be established by a communications services provider, by an emergency services provider, by a company or other entity managing the information, by a financial services company associated with the financial information, by a user, or by another entity.

As noted above, the specific rule to be applied may be dictated by the geographic region within which the Device 105 associated with the identifier is located. Different Devices 105 may have similar rules which apply in geographic regions that vary significantly among devices. According to various embodiments, the geographic regions dictating the applicability of a rule are variable, depending on additional factors. Such factors may include, without limitation, time of day, day of the week, specific user, movement history, transaction history, account history, recent transactions, Device 105 location, request location, and so on. However, the geographic regions may be fixed, and may be in a grid system. The geographic region may comprise an area within a specified distance of the location originating an action request. Thus, in some embodiments, action requests may be addressed by comparing the location of a Device 105 with the location which originates an action request (i.e., whether they are within a specified distance of one another). Alternatively, action requests may be addressed by comparing the location of a Device 105 with the location which originates an action request to see if they are in the same fixed region. One skilled in the art will recognize the different possibilities.

For purposes of discussion, specific geographic regions may be discussed where "logical location" terminology is used (e.g., different regions are associated with home, school, work, businesses and other points of interest situated in such regions). This terminology is used to aid in the understanding of the invention, and is not limiting. Thus, any reference to such a "logical location" (i.e., home, school, etc.) may be understood to relate to a geographic region as that term is used elsewhere in the Description, and vice versa.

Figure 3A:
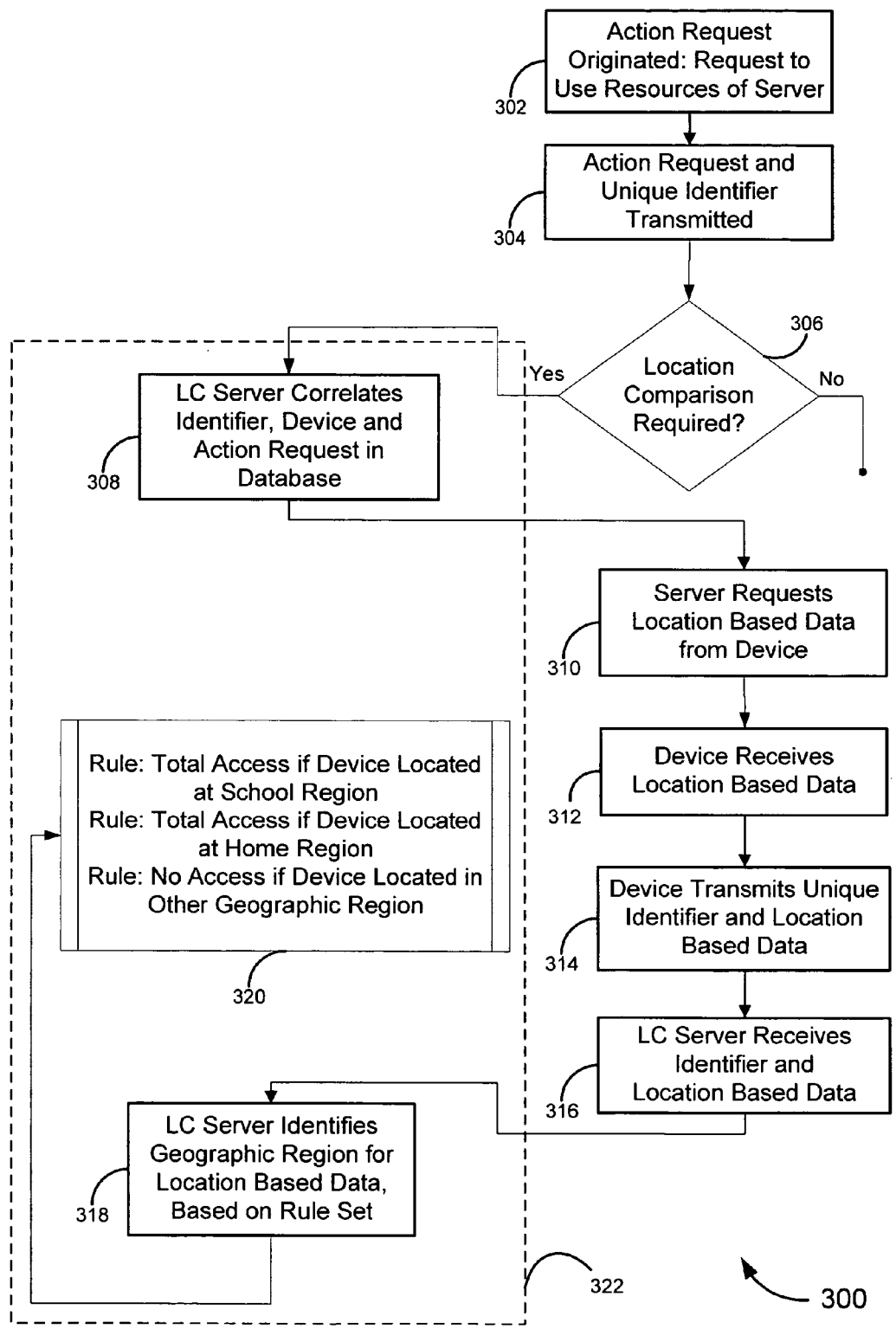
FIG. 3A is a flow diagram that illustrates a system for identifying applicable location based rules related to a network connected device according to various embodiments of the present invention.

In an exemplary embodiment, FIG. 3A illustrates how an action request may be processed 300 by a Location Comparison Server 110 in conjunction with the Database 115. At block 302, an action request is originated by an Action Request Originator 120, wherein a request is made to use the resources of a server. For example, the request might relate to a request to access premium Internet content. The action request, and a unique identifier, may then be transmitted to the Location Comparison Server at block 304. The action request need not originate from the Device 105 associated with the identifier, as it could be initiated from any other Originator 120. Alternatively, the action request may originate from the Device 105 associated with the identifier. At block 306, the Location Comparison Server 110 determines whether the action request requires location verification. If not, no rule is applied, and other processes (either on the LC Server 110 or elsewhere) manage the request. If location comparison is required, the Location Comparison Server 110 queries the Database 115 and correlates the identifier, the Device 105 associated with the identifier, and action request in the Database at block 308.

In some embodiments, the server may then request, at block 310, location based data from the Device 105 associated with the identifier. At block 312, the Device 105 receives the location based data, and at block 314 transmits its unique identifier and the received location based data in a communications signal directed to the Location Comparison Server 110. At block 316, the Server 110 receives the location based data and the identifier. The Server 110 then identifies, at block 318, the geographic region or regions where the Device 105 is located from the relevant options. In this embodiment, a rule is applicable only in the geographic region that it is associated with and, thus, the location of the Device 105 determines the applicability of a rule. Block 320 illustrates an example of this concept, as access to the Premium content may be allowed if a Device is located at School or at Home, but not elsewhere. In some embodiments, the area within the dashed line and noted by reference numeral 322 encompasses the Server 110-Database 115 interaction.

Figure 3B:
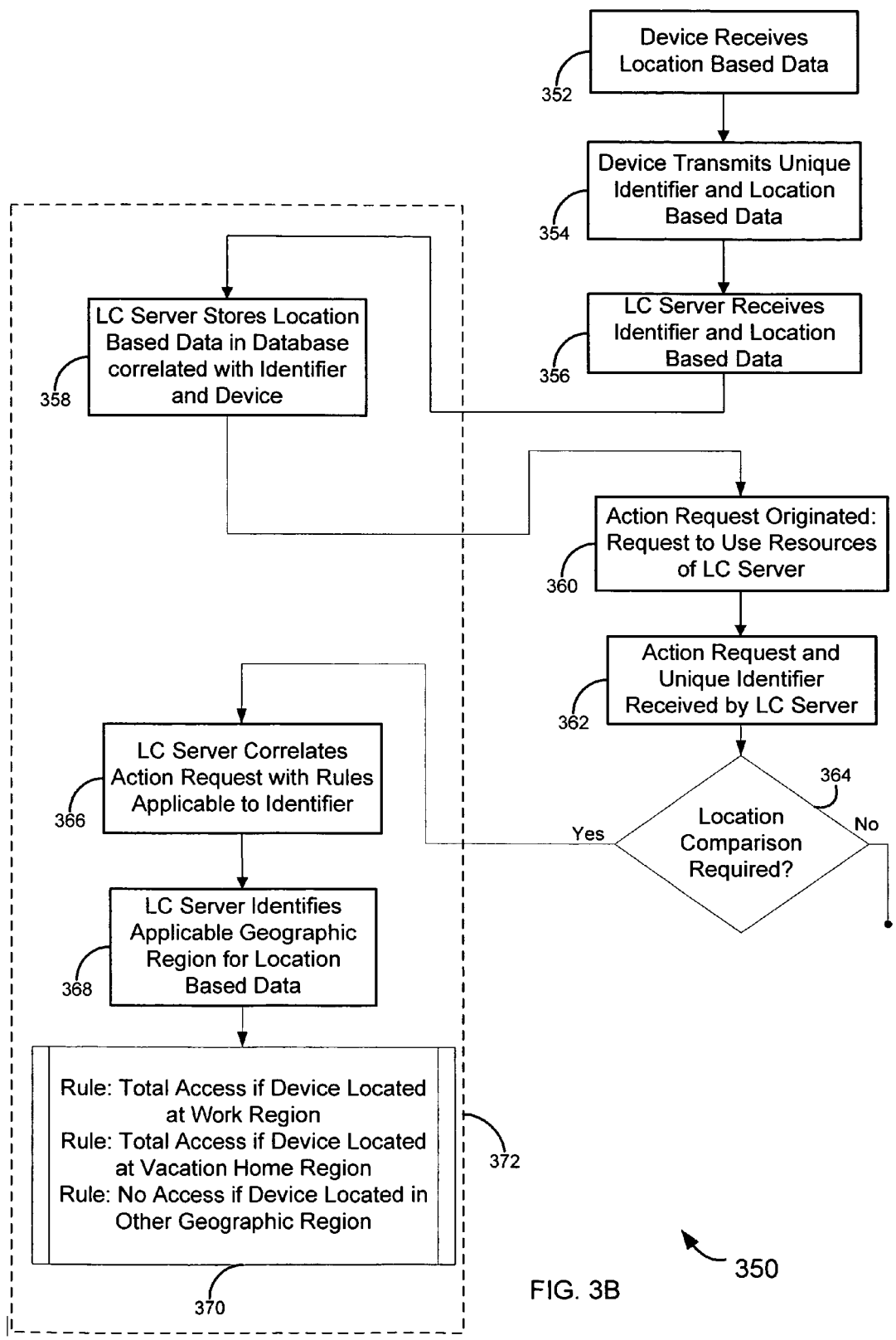
FIG. 3B is a flow diagram that illustrates an alternative system for identifying applicable location based rules related to a network connected device according to various embodiments of the present invention.

In another exemplary embodiment, FIG. 3B illustrates how an action request may be processed 350 by a Location Comparison Server 110 in conjunction with the Database 115. At block 352, the Device 105 receives the location based data, and at block 354 transmits its unique identifier and the received location based data in a communications signal directed to the Location Comparison Server 110. The Server 110 receives the location based data and the identifier at block 356. The Server 110 may then store the location based data in the Database in block 358, correlated with the identifier and the Device.

In some embodiments, an action request is originated, wherein a request is made to access resources of the Server at block 360. For example, the request may relate to a request to access secure documents away from a workstation. The action request, and the unique identifier of the Device 105, may then be transmitted by the Originator 120, and received by the Location Comparison Server 110 at block 362. As noted above, the action request need not originate from the Device 105 associated with the identifier, as it could originate from any other Originator 120. At block 364, the Location Comparison Server 110 determines whether the action request requires location verification. As above, if not, no rule is applied, and other processes manage the request. If location comparison is required, the Location Comparison Server 110 queries the Database 115 and correlates the action request with the rules applicable to the identifier at block 366. The Server 110 then identifies, at block 368, the applicable geographic region using the location based data. With the geographic region (or regions) identified, a rule associated with the geographic region may then be identified as well. In these exemplary embodiments, and shown at block 370, a request to access secure documents away from a workstation may be granted if the user is at geographic regions representing their work or their vacation home, and denied elsewhere. Alternatively, instead of being denied, a variety of additional options requiring secondary or tertiary checks may be applied. In some embodiments, such options could be specified by a user, an employer, a service provider, or other entity. According to some embodiments, the area within the dashed line as noted by reference numeral 372 encompasses the Server 110-Database 115 interaction.

5. Action Request Origination Location↔Rule/Geographic Region: According to various embodiments of the invention, an action request may be associated with a location. An Action Request Originator 120 may receive a set of data identifying the location of the action request. This location based data may reflect the physical location from which the action request originated, and different degrees on specificity may be used. In some embodiments, the set of data identifying the location of the action request may reflect the location of the Action Request Originator 120. The set of data identifying the location of the action request may be received in the same manner, or means, as described above for the Device 105. This location based data may be transmitted with the action request and identifier of a Device 105 in one or more communication signals over a Network 125, and received by the Location Comparison Server 110. It is worth noting again that the action request, and location based data associated with the action request, may be transmitted with the unique identifier of a Device 105 that is not necessarily the transmitting device or the Action Request Originator 120.

Figure 4A:
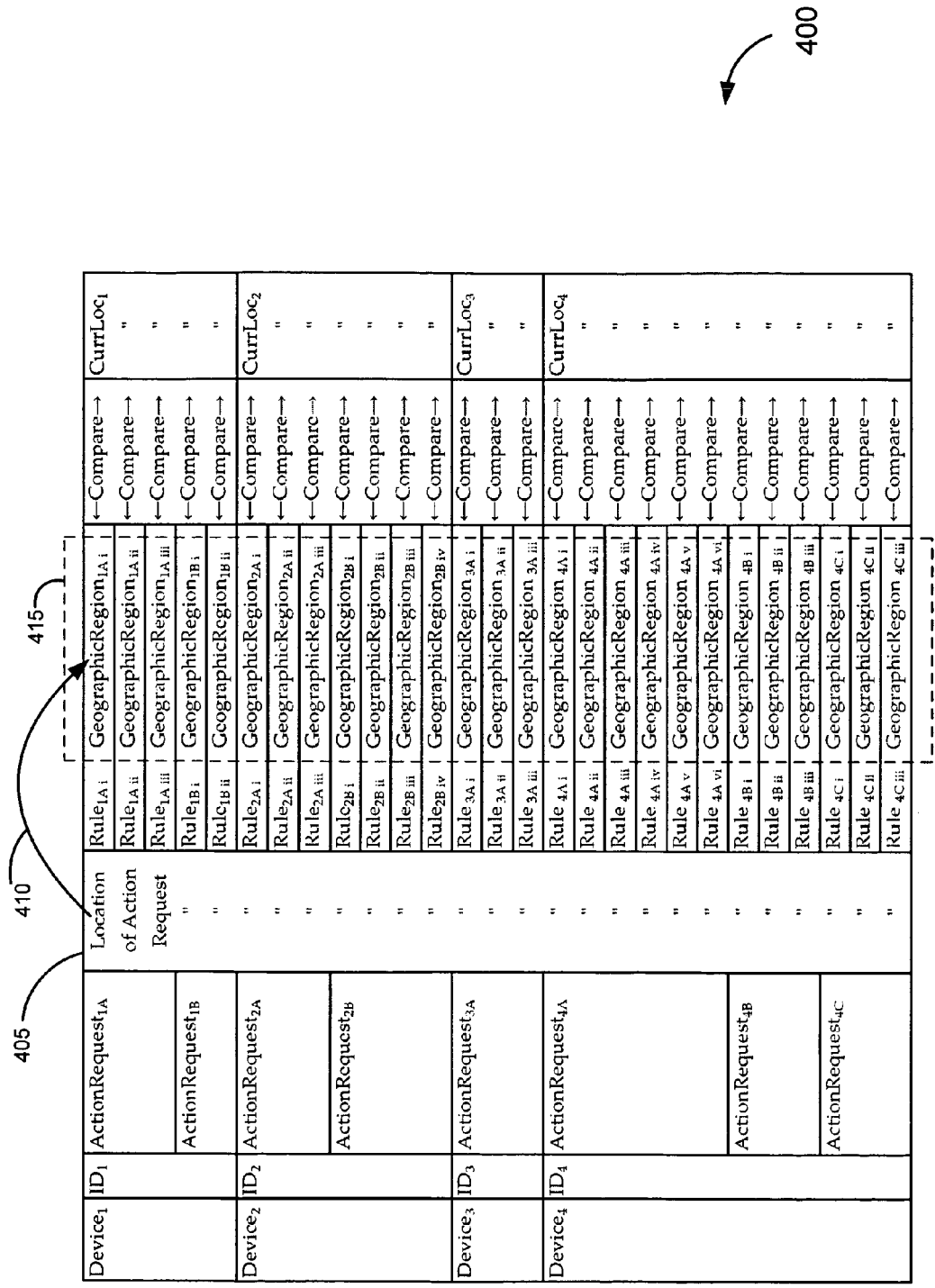
FIG. 4A represents an example of a table illustrating the relationship between certain factors, including the location of an action request, that may be used to identify applicable location based rules related to a network connected device according to various embodiments of the present invention.

The set of data identifying the location of the action request may be stored in the Database 115 (or elsewhere) by the Location Comparison Server 110. This location based data may be associated or otherwise correlated with the identifier. The identifier may serve as the link between the action request and the Device 105. FIG. 4A shows a table 400 which is provided for exemplary purposes only, and illustrates a variation from FIG. 2 showing how the Database 115 may be structured according to certain embodiments of the invention. The table 400 contains a column for the storage of the location of an action request 405. The location of the action request may serve as an additional determinant dictating 410 the boundaries of the geographic regions 415 which specify the applicability of the rules. This concept may be employed in a variety of configurations as known by those skilled in the art. The specific manner in which the location of an action request dictates or modifies the boundaries of a given geographic region may be incorporated in the rule itself, within an Application of the Server 110, or otherwise embodied on a computer-readable medium.

Figure 4B:
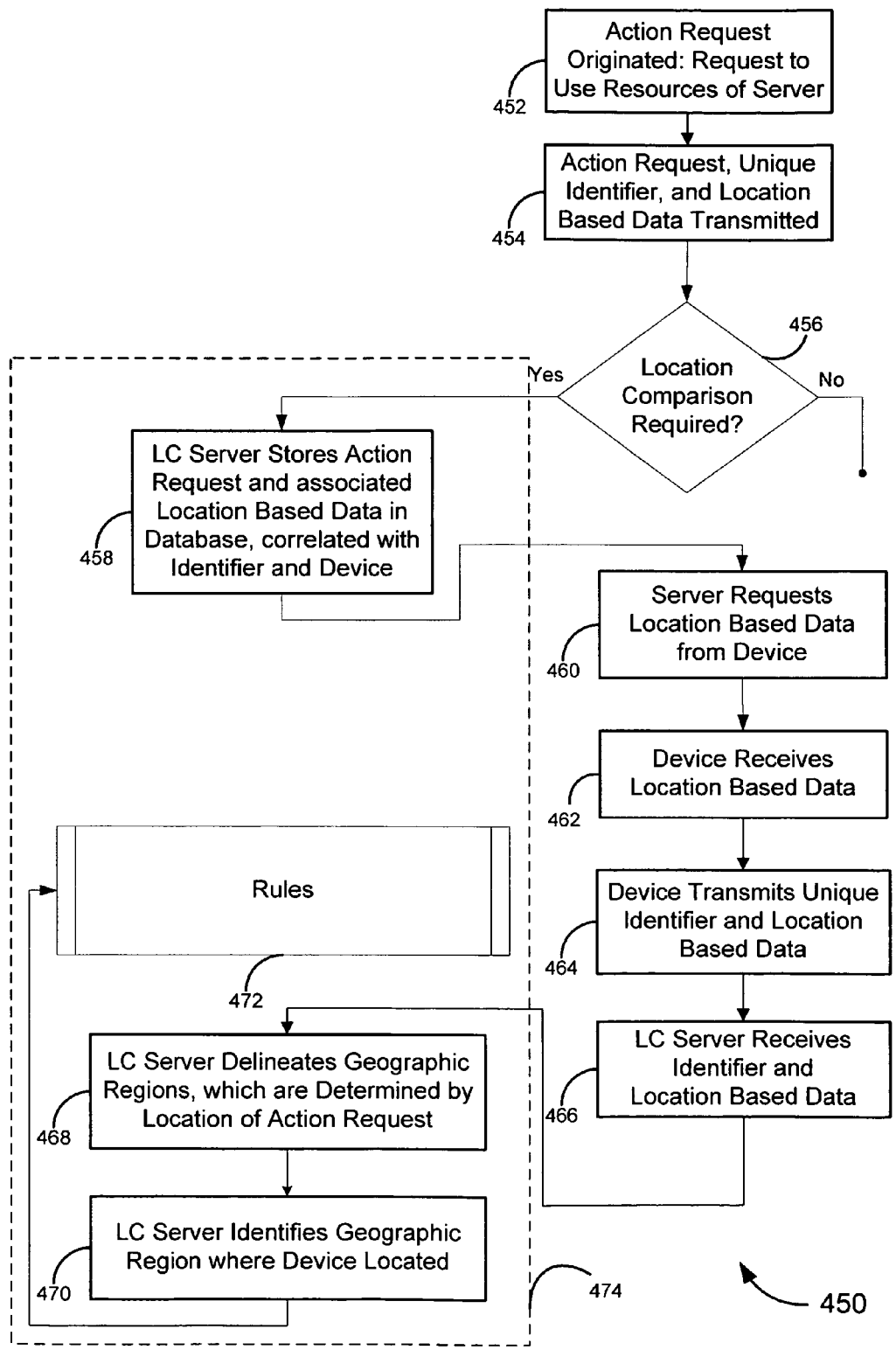
FIG. 4B is a flow diagram that illustrates a system in which certain factors, including the location of an action request, are used to identify applicable location based rules related to a network connected device according to various embodiments of the present invention.

In yet another exemplary embodiment, FIG. 4B illustrates how an action request, transmitted with a set of data identifying the location of the action request, may be processed 450 by a Location Comparison Server 110 in conjunction with the Database 115. At block 452, an action request is originated by an Action Request Originator 120, wherein a request is made to use the resources of a server. For purposes of this example, the request relates to a request to authorize a transaction. The action request, location based data associated with the Originator 120, and a unique identifier, may then be transmitted to the Location Comparison Server 110 at block 454. As noted above, the action request need not originate from the Device 105 associated with the identifier, as it could be initiated from any other Originator 120. At block 456, the Location Comparison Server 110 determines whether the action request requires location verification. If not, other processes manage the request. If location comparison is required, the Location Comparison Server 110 may communicate with the Database 115 and store the location based data associated with the Originator 120 and action request, correlated with the identifier and the Device 105 associated with the identifier at block 458.

In some embodiments, the server may then request, at block 460, location based data from the Device 105 associated with the identifier. At block 462, the Device 105 receives the location based data, and at block 464 transmits its unique identifier and the received location based data in a communications signal directed to the Location Comparison Server 110. At block 466, the Server 110 receives the location based data and the identifier. The Server 110 then delineates, at block 468, the boundaries of the geographic regions where the rules will be applicable. In such embodiments, the geographic regions may be determined by the location of the action request. The Server 110, at block 470, identifies the geographic region where the Device 105 is located, and thereby identifies a rule applicable to the action request at block 472. In some embodiments, the area within the dashed line and noted by reference numeral 474 encompasses the Server 110-Database 115 interaction.

Figure 4C:
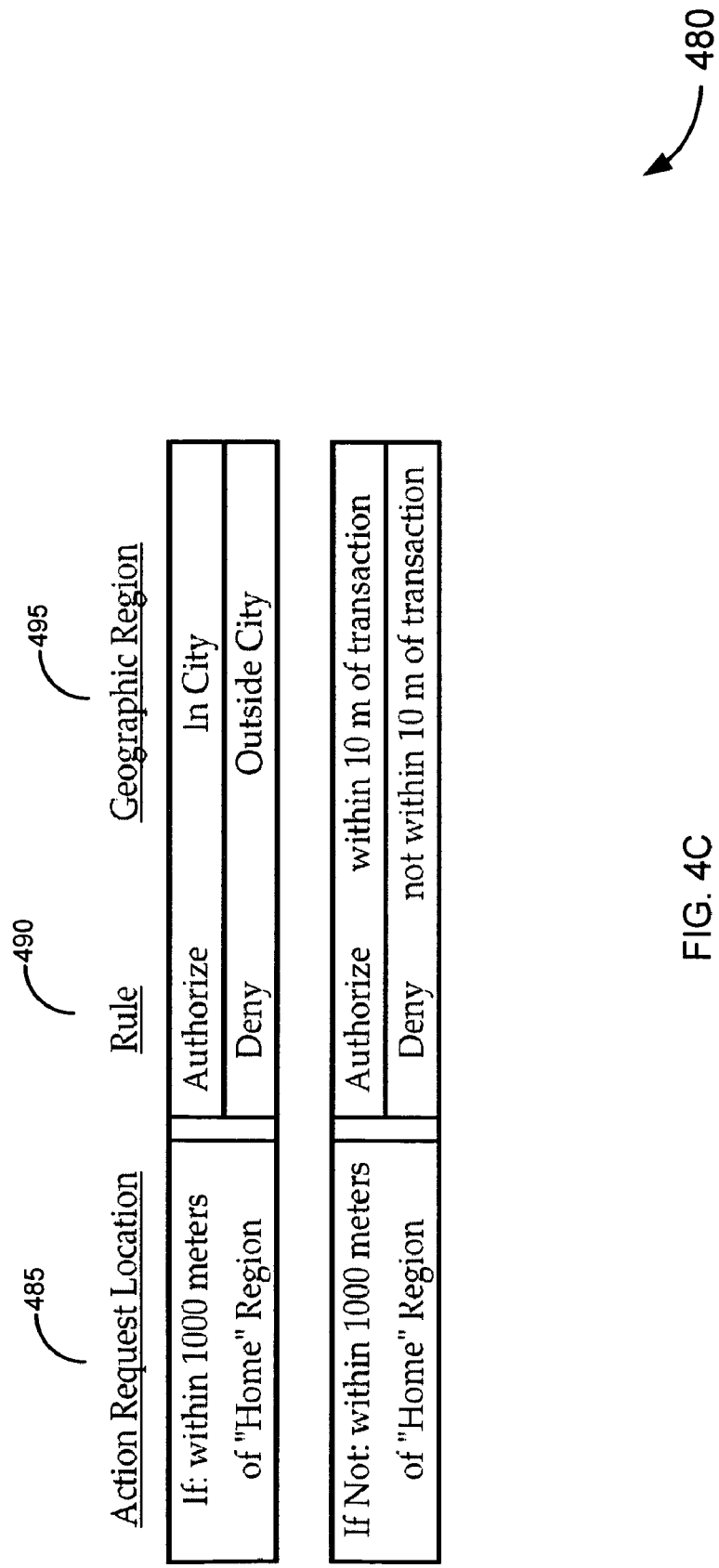
FIG. 4C represents an example of a table illustrating how a location of an action request may be used to identify applicable location based rules related to a network connected device according to various embodiments of the present invention.

An exemplary embodiment 480 shown in FIG. 4C, a diagram relates how the location of the action request may modify a geographic region within which the rule from block 472 is applicable. In this simplistic example, the location of the action request 485 is shown with two variables: within 1000 meters of "Home" region, or outside that area. For purposes of this example, the request relates to a request to authorize a transaction. The rules 490, comprising authorize or deny, are applicable in different geographic regions 495 depending on the action request (i.e. transaction) location. If the transaction request is made within 1000 meters of "Home," the transaction request may be authorized as long as the Device 105 is within the city limits. If outside 1000 meters, the transaction request may be authorized as long as the Device 105 is within 10 meters of the transaction. Such a system might be of value to a person who wants to be able to shop near home without bringing the Device 105, but wants added security elsewhere. As noted, this embodiment is presented for exemplary purposes only, and does not in any way limit the alternative embodiments that are evident to one skilled in the art.

Figure 5:
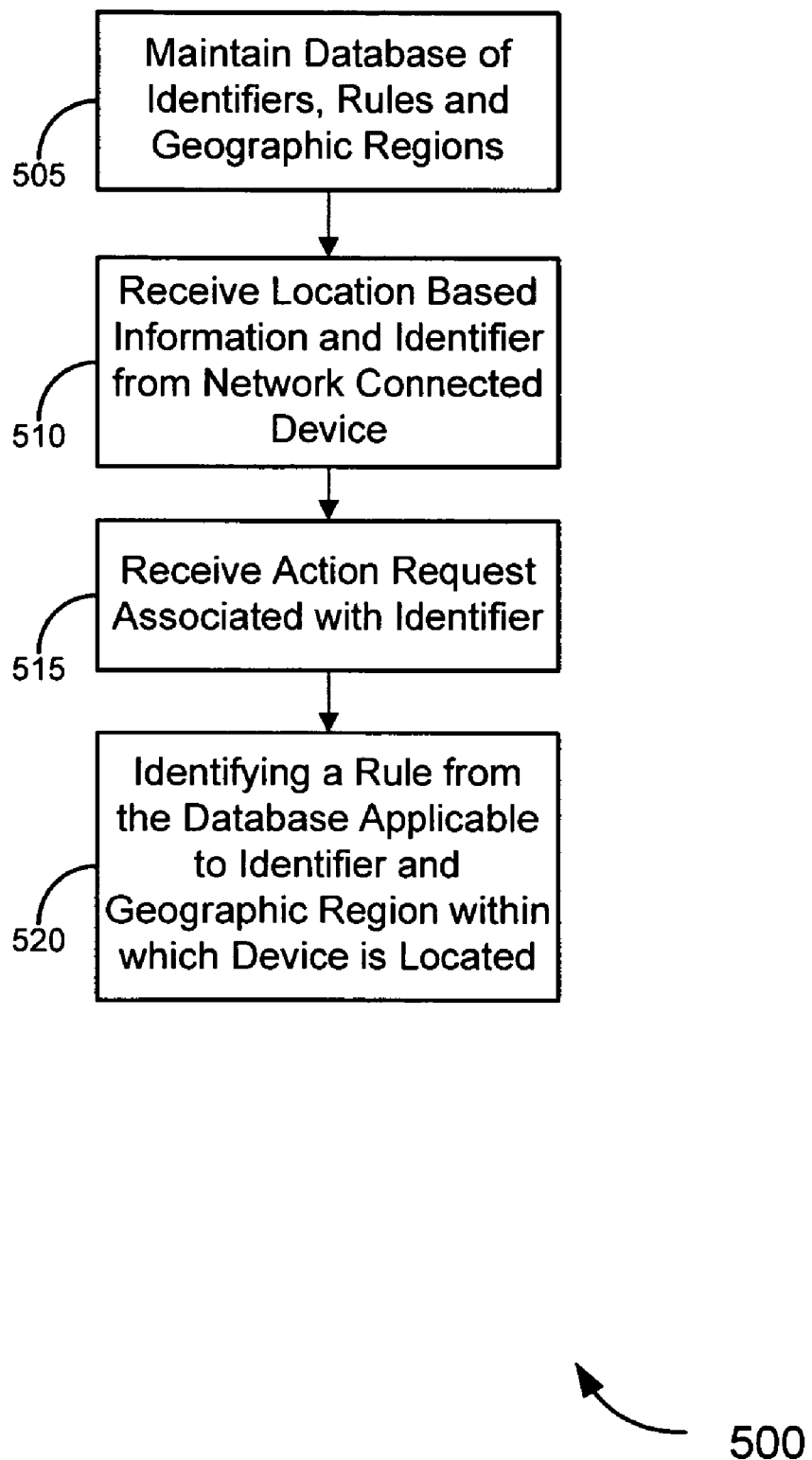
FIG. 5 is a flow diagram that illustrates a method for identifying applicable location based rules related to a network connected device according to various embodiments of the present invention.

6. Method for Identifying Location Based Rules: In some embodiments of the invention, a method 500 for identifying location based rules on a server related to a network connected device is described, as illustrated in FIG. 5. At block 505, a database is maintained, and an example of such a database is illustrated at 115 in FIG. 1. The database includes a table of identifiers, each identifier unique to a network connected device. The database further includes rules associated with at least one identifier in the table dictating how an action request shall be performed and a plurality of geographic regions, wherein the applicability of each rule is limited to the geographic region associated with that rule.

At block 510, a communications signal from the network connected device is received, comprising a set of data identifying the location of the network connected device and the identifier unique to the network connected device. At block 515, an action request is received, which is associated with the identifier unique to the network connected device. At block 520, the applicable rule is identified, the rule associated with the identifier unique to the network connected device and the geographic region within which the device is located.

Having described a broad set of embodiments of the inventions, an exploration of various alternative embodiments will further enable understanding of the possible variations and option. The descriptions above are to be applied to similar components in the embodiments below so as to avoid unnecessarily repetitive definitions, except where otherwise noted.

III. Financial Card Transaction Authorization: One set of embodiments of the invention provides systems and methods for authorizing a financial card transaction based on the location of a mobile communications device. The set of embodiments described above in II. Broad System Architecture may also authorize financial card transactions, but the following description further enables and modifies certain aspects of the invention. The method can be used in a variety of systems, and other methods can be used as well, as will be apparent to one skilled in the art in light of this disclosure.

Figure 6A:
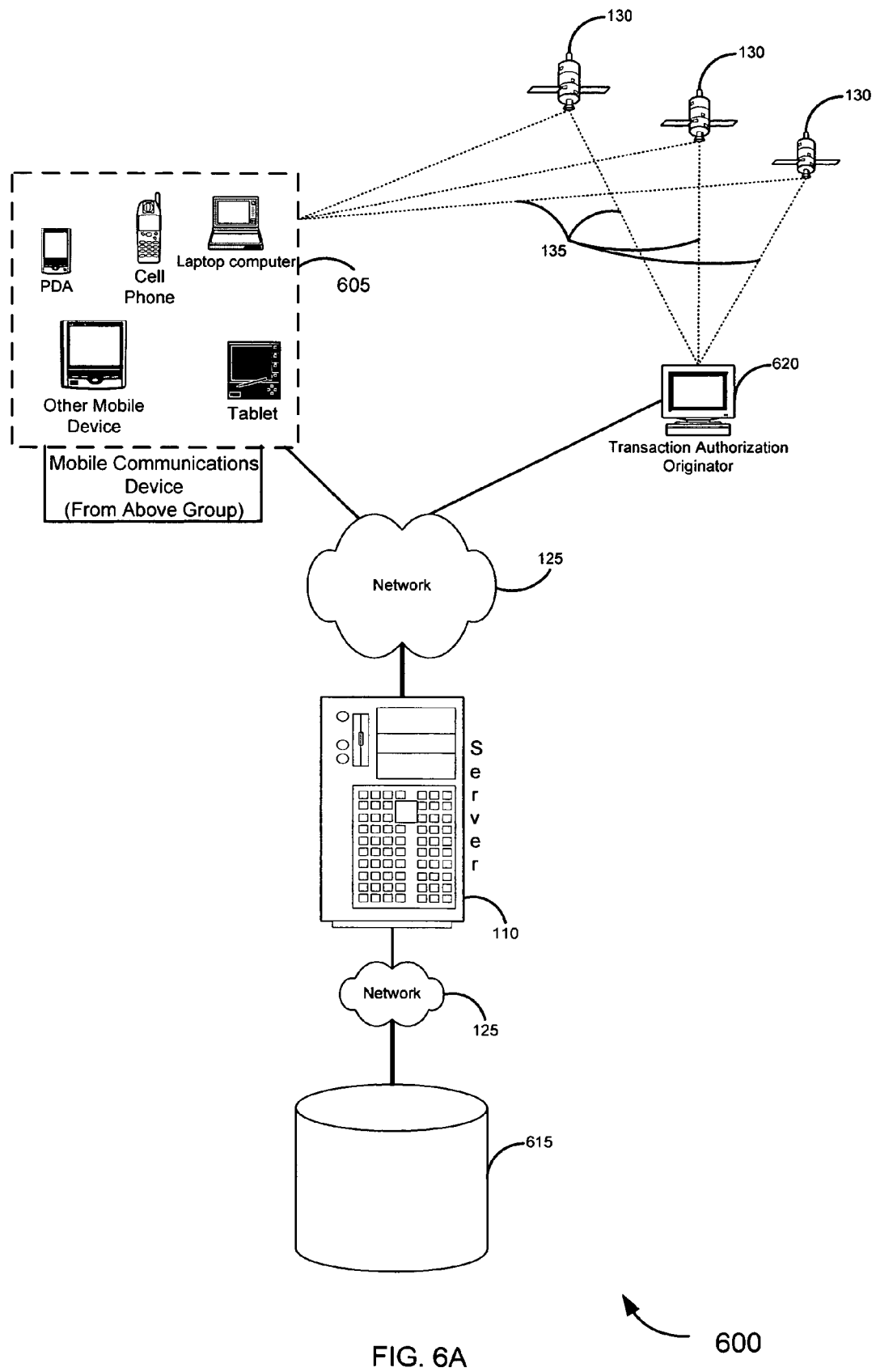
FIG. 6A illustrates a communications system that may be used to authorize a transaction with a financial card based on the location of a mobile communications device and the location of the transaction according to various embodiments of the present invention.

A communication system 600 illustrating a set of embodiments is shown in FIG. 6A. According to some embodiments, a mobile communications device 605 receives a set of data identifying the location of the device, such as GPS coordinates 135. The device may then transmit, in a communications signal, the set of location data and an identifier unique to the mobile device 605 to the Location Comparison Server 110. The Server 110 is in communication with the mobile device 605 and an Authorization Database 615.

The Authorization Database 615 may comprise a table of identifiers (including the identifier of the mobile device 605). In some embodiments, each identifier in the table is unique to a mobile electronics device, and is also associated with at least one financial card number. The Location Comparison Server 110 may receive the communications signal, and store the location based data from the mobile device 605 in the Authorization Database 615. The Server 110 may receive, from a Transaction Authorization Originator 620, a request for authorization of a transaction with a financial card number and data identifying the location of the transaction. In some embodiments, the financial card number is associated, in the Database 615, with the identifier unique to the mobile device 605. The Location Comparison Server may authorize the transaction if the database indicates that the device is located within specified geographic regions, the regions determined by the location of the transaction. In this way, various procedures may be used to compare the location of a financial card transaction with the physical location of a user carrying the mobile device. A number of variations are addressed below.

1. Mobile Device: The mobile communications device 605 may comprise any mobile Network Connected Device 105. Examples include: a cellular phone, a VoIP phone, a personal digital assistant, a pager, a text messaging device, a laptop, a portable digital music player, a two way radio, any mobile computing device, or other mobile device that transmits data signals, or other signals that contain data. A mobile device 605 communicates with a Network 125 or any component thereof, and the connection of the Device 105 and Network 125 may be via any wired, wireless, or other connection. As described above for a Network Connected Device, the mobile device 605 receives a set of data identifying the location of the device, such as GPS coordinates 135. The mobile device 605 may receive the location based data in a variety of ways, in any manner described above. In one embodiment, the receiver may comprise a detachable GPS receiver coupled to a USB connector. The mobile device may then transmit, in a communications signal, the set of location data and an identifier unique to the mobile device 605 to the Location Comparison Server 110. This transmission may occur before, or after, a request to authorize a financial card transaction has been made.

Figure 6B:
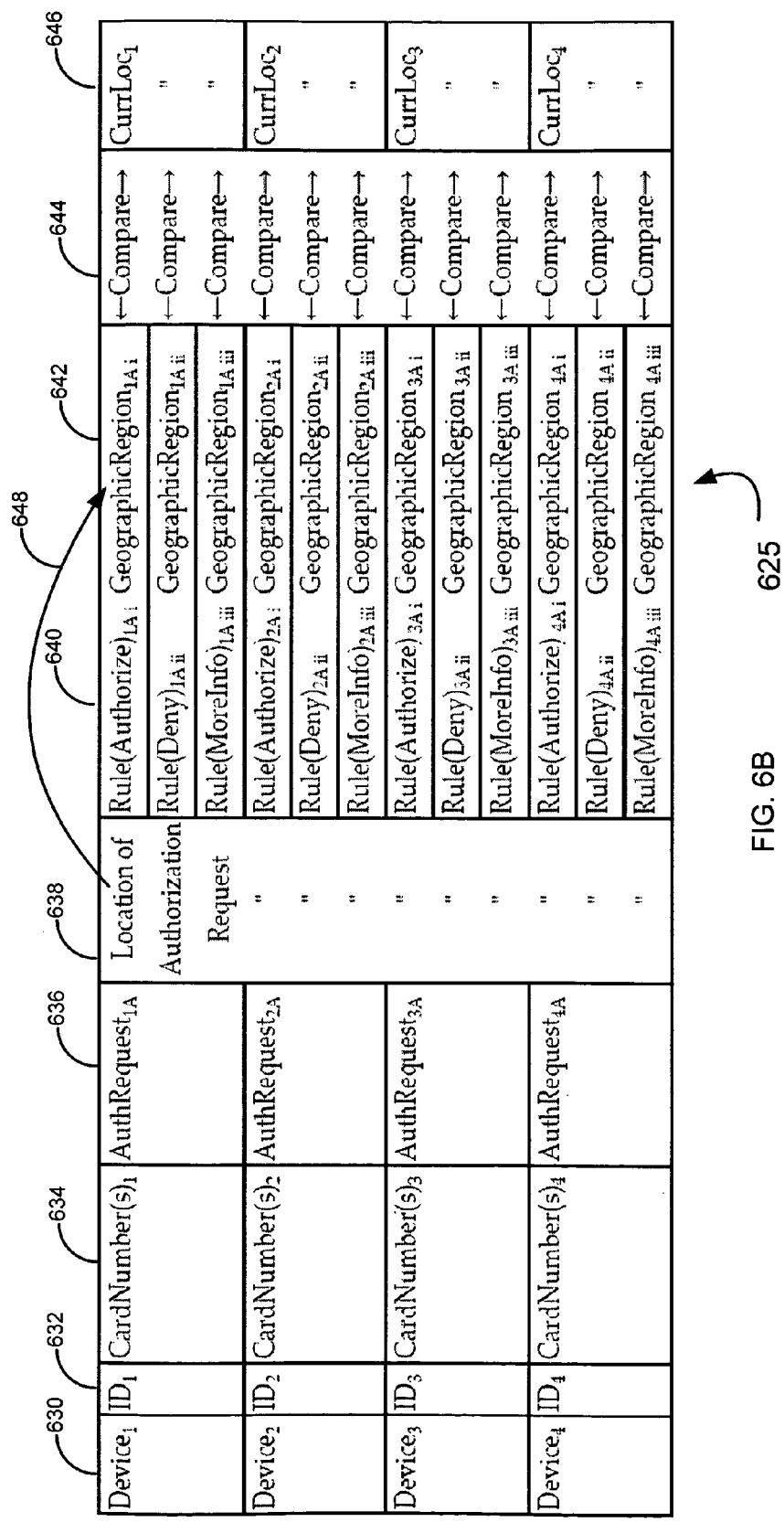
FIG. 6B represents an example of a table illustrating the relationship between certain factors that may be used to authorize a transaction with a financial card according to various embodiments of the present invention.

2. Authorization Database: In this set of embodiments, a mobile device 605 is in communication with the Location Comparison Server 110, and associated Authorization Database 615. The Authorization Database 615 may be designed in the same manner as the Database 115 described above, and may be a component of the Database 115. FIG. 6B shows a table 625 which is provided for exemplary purposes only, and illustrates how the Authorization Database 615 content may be structured according to certain embodiments of the invention. Certain contents of the table 625 described below may not be stored in the Authorization Database 615 and, instead, may be stored elsewhere on a temporary or more permanent basis. The Authorization Database 615 may comprise a table of identifiers 632, each identifier in the table unique to one of any number of mobile communication devices 630. Each identifier and mobile device 605 in the table may also be associated with one, or more, financial card numbers 634. Such cards may include, without limitation, credit cards, debit cards, ATM cards, charge cards, or any other financial cards.

In some embodiments, the table 625 may include any number of requests for authorization of a transaction using a financial card number 636 (i.e., $AuthRequest_{1A}$, $AuthRequest_{2A}$, etc.). In the example, the subscript number denotes the mobile device 605/identifier combination to which the authorization request is applicable, while the subscript capital letter denotes the specific request. In other embodiments, more than one number may be associated with each mobile device 605/identifier, and any number of authorizations may be requested for each such number. An authorization request may be made by a user, a retail merchant, a financial services company, or any other person or organization. As used herein, a financial services company comprises a bank, a savings and loan, a credit card company, an investment company, a mortgage company, a mutual fund company, or any other business entity that provides financial services.

Each authorization request 636 is subject to one or more rules 640 dictating how an authorization request to be performed by the Server 110 shall be performed (i.e., Authorize, Deny, Request more information, etc.—there are many other rules which are evident to those skilled in the art). In various embodiments, the rules are applicable only to a subset of the identifiers in the table, or only a specific identifier.

The table 625 also includes a plurality of geographic regions 642. In some embodiments, each geographic region 642 is associated with a rule 640, wherein the applicability of a rule 640 is limited to the geographic region 642 associated with that rule 642. The applicable geographic region 642 may be determined by comparing 644 the location 646 of mobile device 605 to different geographic regions 642 to see if it is within a given region. For a given device 605, the applicable rule 640 may be determined by the correlating a rule 640 applicable to an authorization request 636 with the geographic region 642 within which a device 605 is located 646.

The table 625 also contains a column for the location of a request to authorize a transaction 638. This location may comprise the "Location of Action Request 405" described above. The location of the request to authorize the transaction may serve as an additional determinant dictating 648 the boundaries of the geographic regions 642 which specify the applicability of the rules. This concept may be employed in a variety of configurations as known by those skilled in the art. The specific manner in which the location of an authorization request dictates or modifies the boundaries of a given geographic region may be incorporated in the rule itself, within an Application of the Server 110, or otherwise embodied on a computer-readable medium. In another embodiment, the database may comprise additional rules dictating how the location of the transaction will determine the geographic regions 642.

In some instances, a transaction may be authorized if the comparison between the location of the mobile device 605 and the transaction are within a specified distance of each other. Thus, the geographic region 642 to authorize 640 a transaction may be determined 648 by the location 638 of the request, as the region may simply be the circular area around the request location with a radius equal to the specified distance. In other embodiments, the geographic regions 642 may each be fixed and, thus, the transaction may be authorized if the mobile device 605 and the transaction are located in the same geographic region. In still other embodiments, the location of the mobile device 605 may also be a determinant of the boundaries of the geographic regions. For example, if the device is located in an area that is not traveled to often by the user, the geographic region for authorization may be small. Alternatively, if the device is located in the home of a user, the authorization region may be larger. In some embodiments, some rules (and the geographic regions associated therewith) may require additional authentication, such as a picture download to verify identity, a second form of identification, or a secure password or PIN. Such additional authentication could also require the input of a secure password or PIN received via a text or other short message on the mobile device 605.

Furthermore, in certain embodiments, the determinants of the geographic regions may be dictated by a financial services company, a user, a card issuer, or other entities or persons. For example, the Authorization Database 615 may allow input of user preferences dictating how the location of the transaction or the device may dictate the boundaries of the geographic regions 642. For example, if a user is traveling overseas, a user may change rules for the regions of travel according to some embodiments. In light of this discussion, and as addressed previously, geographic regions are often variable based on the factors discussed elsewhere in this Description.

3. Location Comparison Server 110: The Location Comparison Server 110 may authorize a transaction request according to rules in the Authorization Database 615, in a similar manner as that described above for the Database 115. Application software running on the Location Comparison Server 110 may receive a request to authorize a financial card transaction based on a financial card number. The Server may associate card number with an identifier, and query the database to identify the applicable rule associated with the authorization given the location of the Device.

The Location Comparison Server 110 may identify the applicable rule from a set of rules which dictate the different ways in which an authorization request from a given mobile device 605 will be handled, with each rule dependent on the geographic region in which a device 605 is located. Each rule may apply to one, or more, device 605/identifier combinations, and different rules may apply to the different financial card numbers associated with the same device 605/identifier combination.

4. Authorization Request Origination Location↔Rule/Geographic Region: A request to authorize a transaction relating to a financial card number relates to any part of the authorization process that may be provided by a server, such as the Location Comparison Server. An authorization request may originate from any network connected device or other computing device which communicates with a Network 125. For ease in discussion, such a device will be termed a "Transaction Authorization Originator 620." The transaction Authorization Originator 620 includes any such device which transmits or otherwise initiates an authorization request.

The Authorization Request Originator 120 may receive a set of data identifying the location of the action request, or may have the location manually entered. According to various embodiments, the Originator 620 transmits an authorization request, the set of data identifying the location of the request, and a financial card number via one or more communication signals. The communications signals from the Originator 620 may be transmitted in the same manner described above relating to transmissions from the Device 105. One purpose of the correlation of the identifier to the financial card number in the Authorization Database may be to link an authorization request to a mobile device 605. This may be of importance because an authorization request may be initiated from a Device 605, or may be initiated from another source. Such a source may be a retail location, a card issuer, a financial institution, or other such party.

Figure 6C:
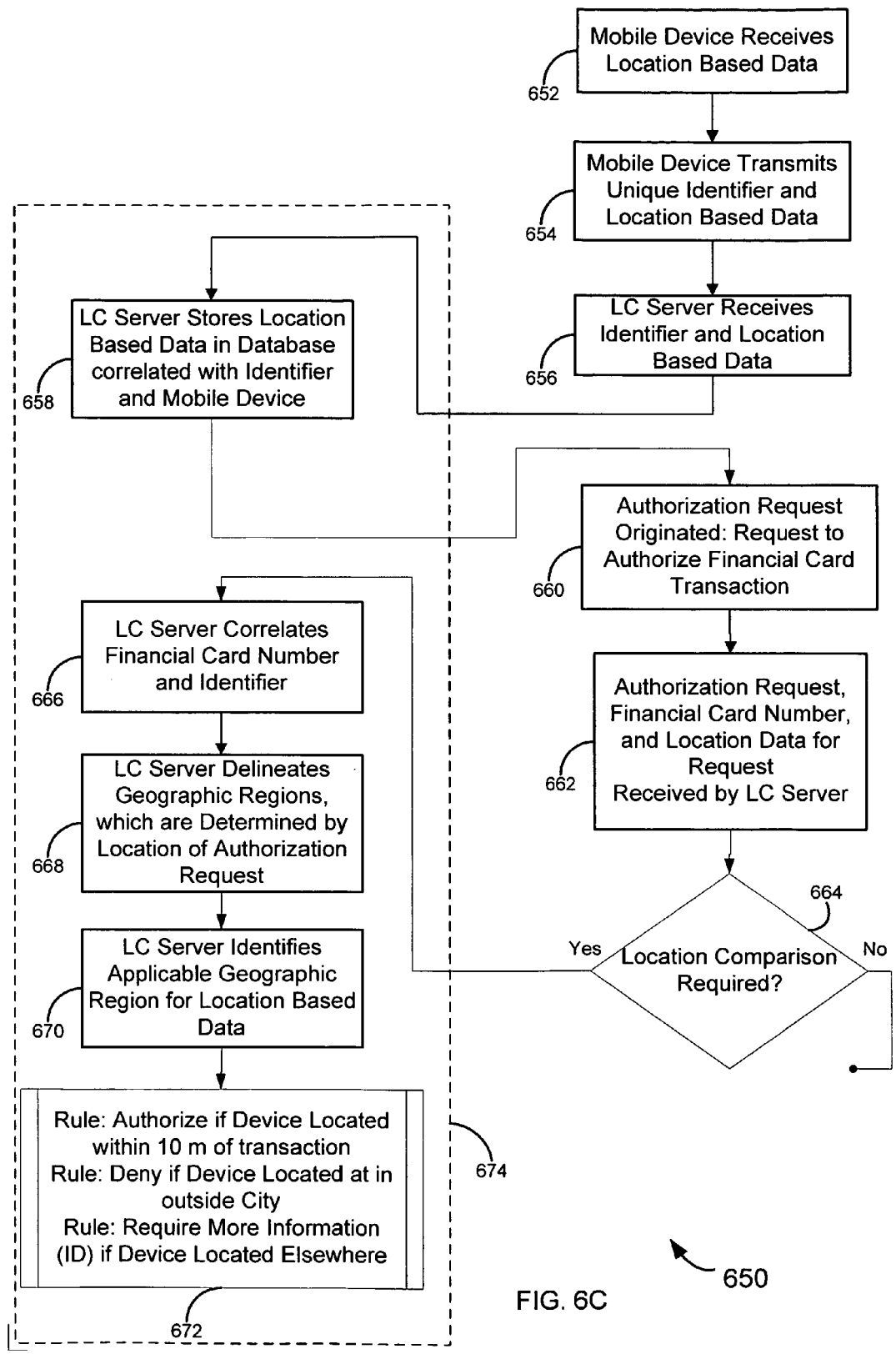
FIG. 6C is a flow diagram that illustrates a system that may be used to authorize a transaction with a financial card based on the location of a mobile communications device and the location of the transaction according to various embodiments of the present invention.

FIG. 6C illustrates how an authorization request may be processed 650 by a Location Comparison Server 110 in conjunction with the Database 115. At block 652, the mobile device 605 receives the location based data, and at block 654 transmits its unique identifier and the received location based data in a communications signal directed to the Location Comparison Server 110. The Server 110 receives the location based data and the identifier at block 656. The Server 110 may then store the location based data in the Database in block 658, correlated with the identifier and the Device.

In some embodiments, an authorization request is originated, wherein a request is made to authorize a financial card transaction at block 660. For example, the request may relate to a request to authorize a credit card transaction at a retail location. The action request, and the unique identifier of the Device 105, may then be transmitted by the Originator 620, and received by the Location Comparison Server 110 at block 662. In this instance, for example, the entity controlling the Originator 620 may be a retail merchant, a credit card company, or other financial institution. At block 664, the Location Comparison Server 110 determines whether the authorization request requires location verification. If not, other processes manage the request. If location comparison is required, the Location Comparison Server 110 queries the Database 115 and correlates the financial card number with the unique identifier at block 666. The Server 110 then delineates, at block 668, the boundaries of the geographic regions in light of the location of the authorization request. The applicable geographic region(s) are identified at block 670, and a rule associated with a geographic region may then be identified as well, at block 672. In these exemplary embodiments, shown at block 672, a transaction may be authorized if the device is in a geographic region comprising the area 10 meters around a transaction. If the transaction and the device are not located in the same city, the transaction will be denied according to these embodiments. More information may also be required in certain instances. According to some embodiments, the area within the dashed line as noted by reference numeral 674 encompasses the Server 110—Database 115 interaction.

Figure 6D:
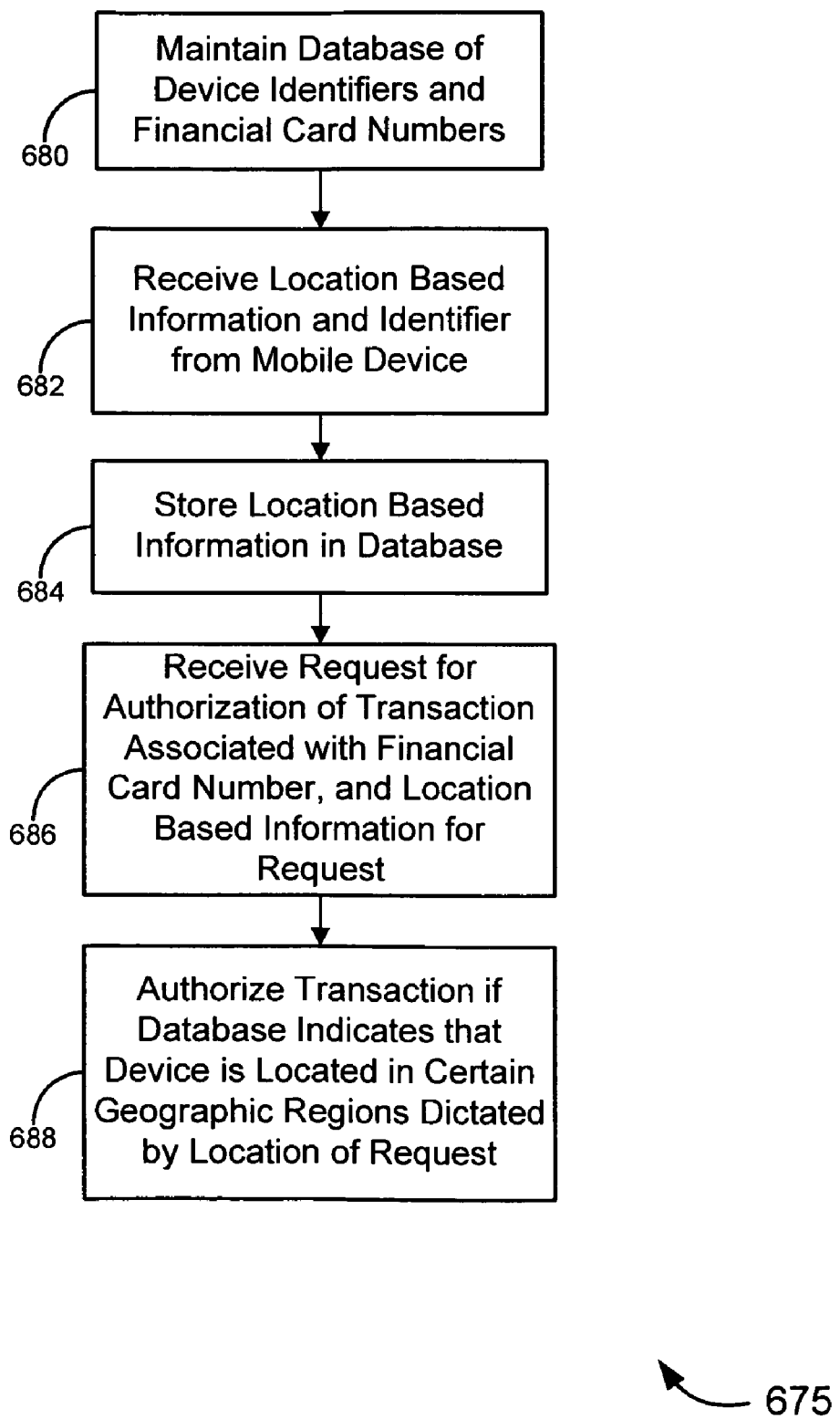
FIG. 6D is a flow diagram that illustrates a method that may be used to authorize a transaction with a financial card based on the location of a mobile communications device and the location of the transaction according to various embodiments of the present invention.

5. Method of Authorization of Financial Card Transaction: In some embodiments of the invention, a method 675 for processing an authorization request on a server related to a mobile device 605 is described, as illustrated in FIG. 6D. At block 680, a database is maintained, and an example of such a database is illustrated at 615 in FIG. 6A. The database comprises a table of identifiers, each identifier unique to a network connected device, with each identifier associated with one or more financial card numbers.

At block 682, a communications signal from a mobile device is received, comprising a set of data identifying the location of the mobile device and the identifier unique to the mobile device. At block 684, the set of data identifying the location of the device is stored in the database. At block 686, a request to authorize a transaction with a financial card is received, which is associated with the identifier unique to the mobile device. At block 688, the transaction is authorized if the Database indicates that the mobile device associated with the financial card number is located within certain geographic regions determined, in part, by the location of the mobile device.

IV. Financial Information Access: One set of embodiments of the invention provides systems and methods for allowing (or prohibiting, screening, etc.) access to financial information based on the location of a mobile communications device. The set of embodiments described above in II. Broad System Architecture may similarly screen access to financial information, but the following description further enables and modifies certain aspects of the invention. For example, the present embodiments may allow access based on the location of a mobile communications device, whereas other embodiments may allow access based on the location of any network connected device.

In order to illustrate certain architectural similarities between systems, reference is made to the communications system 100 shown in FIG. 1. The financial information access embodiments provide for a mobile communications device to receive a set of data identifying the location of the device. As noted previously, a mobile communications device represents a subset of the devices described above as network connected devices. According to certain embodiments, the mobile device may transmit, in a communications signal, the set of location data and an identifier unique to the mobile device to the Location Comparison Server 110. The Server 110 is in communication with the mobile device and a Financial Information Access Database (hereinafter "Access Database"). The Access Database may comprise a subset of the Database 115, but may also have additional features. The Location Comparison Server 110 may receive the communications signal, and store the location based data from the mobile device in the Access Database. The Access Database may comprise a table of identifiers (including the identifier of the mobile device). In some embodiments, each identifier is associated with a different set of financial information. The set of financial information may be associated with one or more account numbers. In some embodiments, the account number or numbers are associated, in the Access Database, with the identifier unique to the mobile device.

The Server 110 may then receive a request for access to a set of financial information, and a set of data identifying the location of the request. The set of financial information may include the identifier directly, or indirectly, as it may include an account number or other link to the identifier). The Location Comparison Server 110 may allow access if the Access Database indicates that the device is located within specified geographic regions, the regions determined by the location of the request. In this way, various procedures may be used to compare the location of a request for access to financial information (e.g., certain accounts) with the physical location of an account owner carrying the mobile device. A number of variations are addressed below.

1. Device/Database/Server: The mobile communications device may comprise any mobile Network Connected Device 105, and is described in detail above. The communication between such a mobile device and the Network 125 may be via any wired, wireless, or other connection. The mobile device may receive the location based data in a variety of ways (including integrated hardware or various attachments), in any manner described above. The mobile device may then transmit, in a communications signal, the set of location data and an identifier unique to the mobile device to the Location Comparison Server 110. This transmission may occur before, or after, a request to access financial information has been sent or received.

Figure 7A:
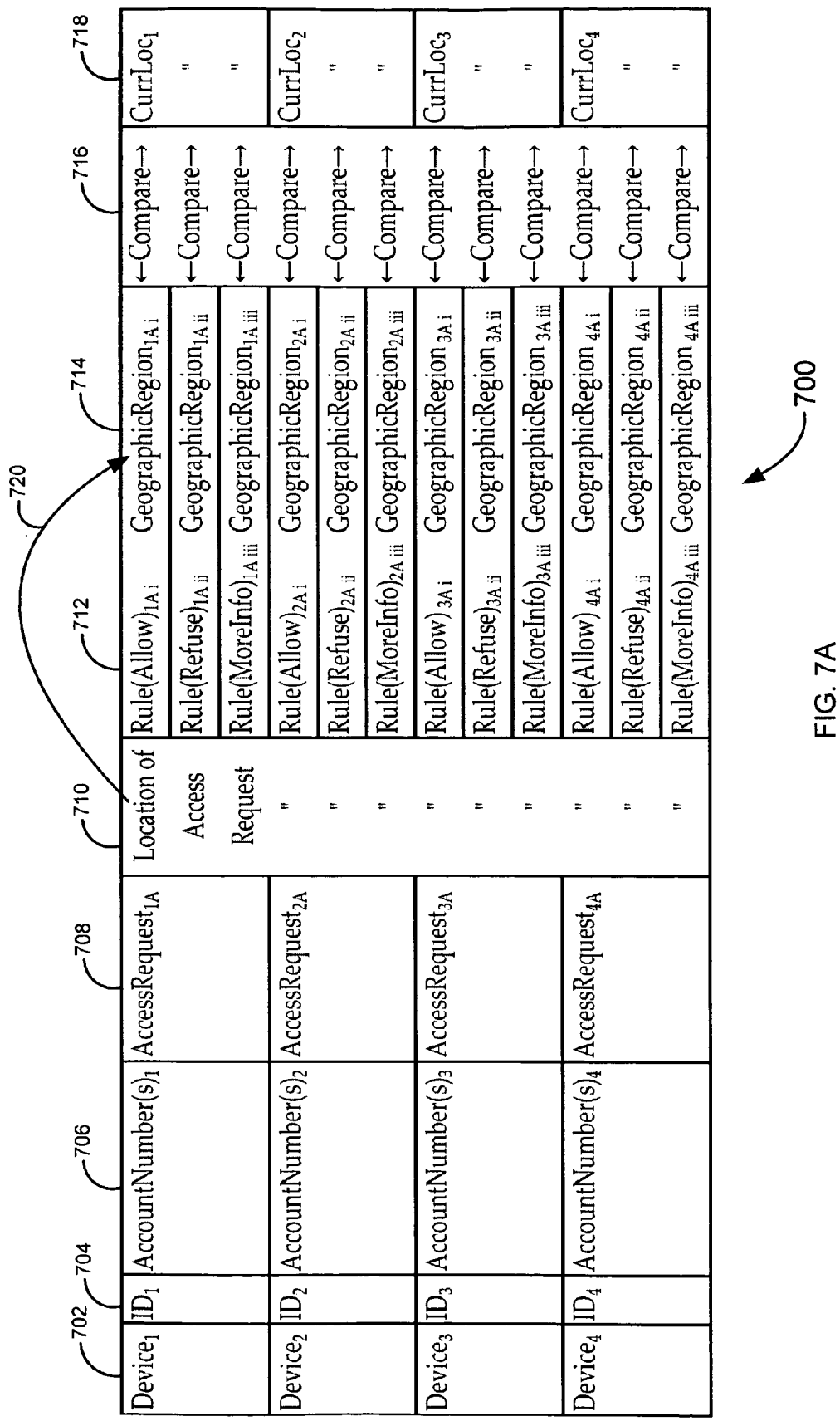
FIG. 7A represents an example of a table illustrating the relationship between certain factors that may be used to authorize a request to access financial information according to various embodiments of the present invention.

In this set of embodiments, a mobile device is in communication with the Location Comparison Server 110, and associated Access Database. The Access Database may be designed in the same manner as the Database 115 described above, and may be a component of the Database 115. FIG. 7A shows a table 700 which is provided to illustrate certain relationships, and show how the Access Database content may be structured according to certain embodiments of the invention. Certain contents of the table 700 described herein may, or may not, be stored in the Access Database and, instead, may be stored elsewhere on a temporary or more permanent basis.

The Access Database may comprise a table of identifiers 704, each identifier in the table unique to one of any number of mobile communication devices 702. Each identifier and mobile device in the table may also be associated with a set of financial information 706, which may comprise one, or more, account numbers. Account numbers may be associated with accounts of individual users, businesses, corporate entities, or others. Such information may include, without limitation, bank accounts, credit card accounts, investment accounts (e.g., stocks, mutual funds, 401(k)), e-commerce accounts, utility accounts, credit card payment information, etc. The set of financial information may also comprise personal information (e.g., name, address, DOB, SS#), corporate information, employment or salary data, account balances, passwords, authentication or encryption data, trade secrets, etc.

In some embodiments, the table 700 may include one or more requests for access to the set (or subset thereof) of financial information 708 (i.e., $AccessRequest_{1A}$, $AccessRequest_{2A}$, etc.). In the example, the subscript number denotes the mobile device 605/identifier combination to which the access request is applicable, while the subscript capital letter denotes the specific request. In some embodiments, more than one account number may be associated with each mobile device 605/identifier, and any number of access requests may be made for each such number. Also, different rules may apply to each account number. An access request may be made electronically, over the phone, or in person. An access request may be made by a user, a merchant, a financial services company, or any other person or organization. An access request may be made from the mobile device, or from another source. The access request may be made from an Action Request Originator 120.

Each access request 708 may be subject to one or more rules 712 dictating how an access request to be performed by the Server 110 shall be performed (i.e., Allow, Refuse, Request more information, etc.—there are many other rules which are evident to those skilled in the art). In some embodiments, the rule may comprise validating a password. In various embodiments, a rule is applicable only to a subset of the identifiers in the table, or only to a specific identifier. Thus, in various embodiments, each set of financial information may be associated with different rules of access. The rules may be established by a communications services provider, a company or other entity managing the information, by a financial services company associated with the financial information, by a user, or by another entity.

The table 700 also includes a plurality of geographic regions 714. In some embodiments, each geographic region 714 is associated with a rule 712, wherein the applicability of a rule 712 is limited to the geographic region 714 associated with that rule 712. The applicable geographic region 714 may be determined by comparing 716 the location 718 of mobile device to different geographic regions 714 to see if the device is within a given region. For a given device, the applicable rule 712 may be determined by correlating each rule 712 associated with an access request 708 with the geographic region 714 within which a device is located 718.

The table 700 also contains a column for the location of an access request 710. This location may comprise the "Location of Action Request 405" described above. The location of the access request may serve as an additional determinant dictating 720 the boundaries of the geographic regions 714 which specify the applicability of the rules. This concept may be employed in a variety of configurations as known by those skilled in the art. The specific manner in which the location of an access request dictates or modifies the boundaries of a given geographic region may be incorporated in the rule itself, within an Application of the Server 110, or otherwise embodied on a computer-readable medium. In another embodiment, the database may comprise additional rules dictating how the location of the access will determine the geographic regions 714.

In some instances, access may be allowed if the comparison between the location of the mobile device and the access request are within a specified distance of each other. Thus, the geographic region 714 to allow 712 a transaction may be determined 720 by the location 710 of the request, as the region may simply be the circular area around the request location with a radius equal to the specified distance. In other embodiments, the geographic regions 714 may each be fixed and, thus, access may be allowed if the mobile device and the transaction are located in the same geographic region. In still other embodiments, the location of the mobile device may also be a determinant of the boundaries of the geographic regions. For example, if the device is not located in the home of a user, the "allow" region may be small, because financial information may be less likely to be accessed away from home. Furthermore, in certain embodiments, the determinants of the geographic regions may be dictated by a financial services company, a user, a card issuer, or other entities or persons. For example, the Access Database may allow input of user preferences dictating how the location of the transaction or the device may dictate the boundaries of the geographic regions 714. In light of this discussion, and as addressed previously, geographic regions are often variable based on the factors discussed elsewhere in this Description.

The Location Comparison Server 110 may authorize an access request according to rules in the Access Database, in a similar manner as that described above for the Database 115. Application software running on the Location Comparison Server 110 may receive a request to access a set of financial information. The Server 110 may associate an account number with an identifier by searching the Access Database 615, and query the database to identify the applicable rule associated with the request given the location of the mobile device. In different embodiments, the Server 110 may directly receive the identifier with the access request. The Location Comparison Server 110 may identify the applicable rule from a set of rules which dictate the different ways in which an authorization request from a given mobile device will be handled, with each rule dependent on the geographic region in which a device is located.

Figure 7B:
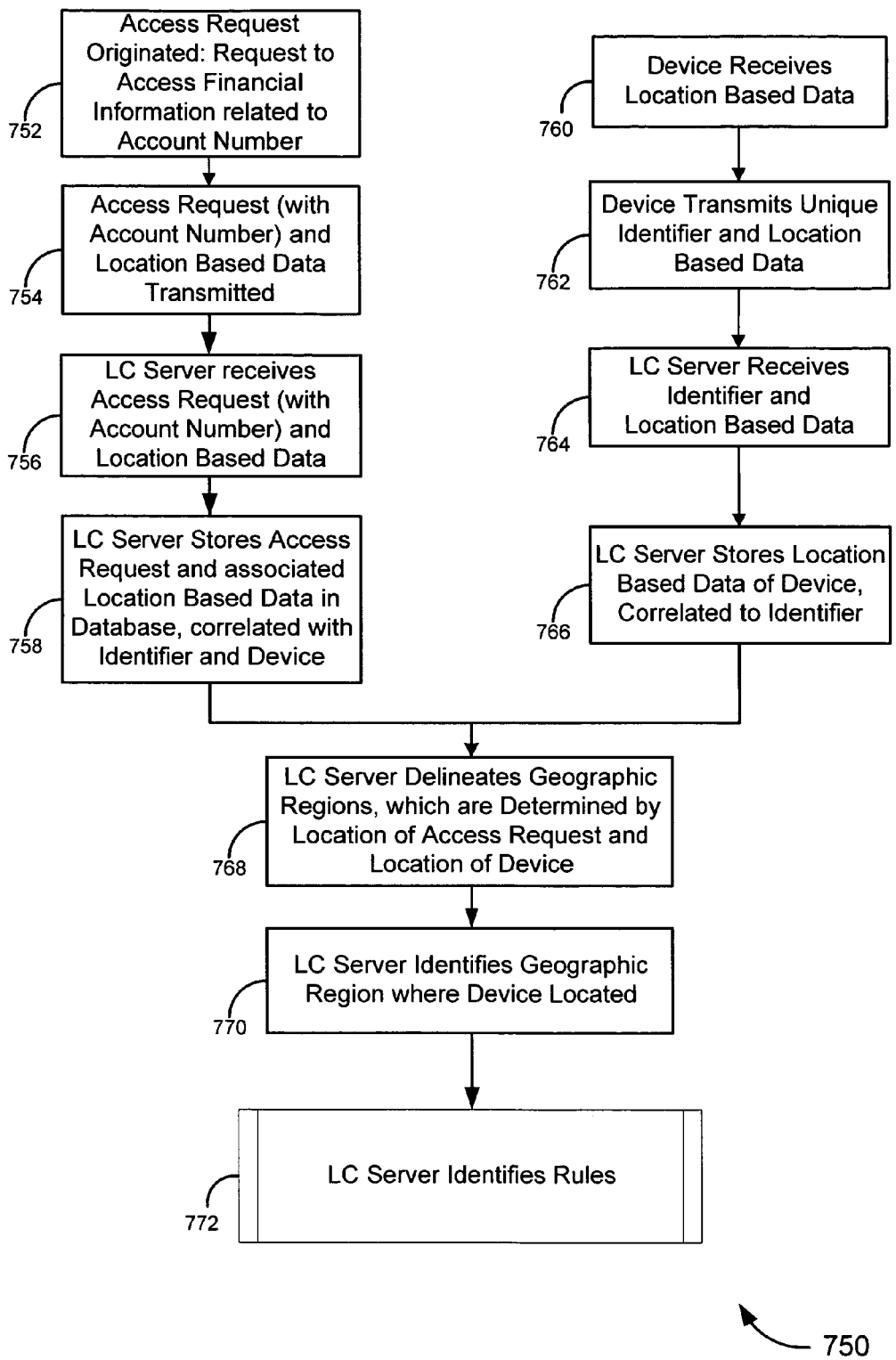
FIG. 7B is a flow diagram that illustrates a system that may be used to authorize a request to access financial information based on the location of a mobile communications device and the location of the transaction according to various embodiments of the present invention.

2. Authorization Request Origination Location↔Rule/Geographic Region: FIG. 7B illustrates how an access request, transmitted with a set of data identifying the location of the action request, may be processed 750 by a Location Comparison Server 110 in conjunction with the Access Database. This is an exemplary embodiment, and merely illustrates relationships that are applicable to this set of embodiments, and the other embodiment of the invention as well. It is worth noting that the access request may comprise an action request 215, as that term is described above. At block 752, an access request is originated. For purposes of this example, the request relates to a request to access credit card account information. The access request (including an account number) and location based data associated with the request, may then be transmitted to the Location Comparison Server 110 at block 754. As noted above, the action request need not originate from the mobile device associated with the identifier, as it could be initiated from any other Originator 120 (e.g., Personal Computer, Workstation, Server, etc.). At block 756, the Location Comparison Server 110 receives the request and location based data. The Location Comparison Server 110 may then, at block 758, communicate with the Database 115 and store the location based data associated with the Originator 120 and Access Request, correlated with the identifier and the mobile device associated with the identifier.

Either before or after the access request is originated, at block 760, the mobile device may receive location based data which indicates the location of the mobile device. At block 762, the device may transmit its unique identifier and the received location based data in a communications signal directed to the Location Comparison Server 110. At block 764, the Server 110 receives the location based data and the identifier. The Server 110 may then, at block 766, store the location based data for the mobile device, associated with the identifier. At block 768, Server 110 delineates the boundaries of the geographic regions where the rules will be applicable. In some embodiments, the geographic regions may be determined by 1) the location of the action request, 2) the location of the device, 3) rules applicable to and account number/mobile device/identifier combination, and 4) additional factors and rules. The Server 110, at block 770, identifies the geographic region where the Device 105 is located, and thereby identifies a rule applicable to the action request at block 772. In alternative embodiments, various combinations of the data illustrated in the table may be included in the Access Database, or stored elsewhere on a temporary or more permanent basis.

Figure 7C:
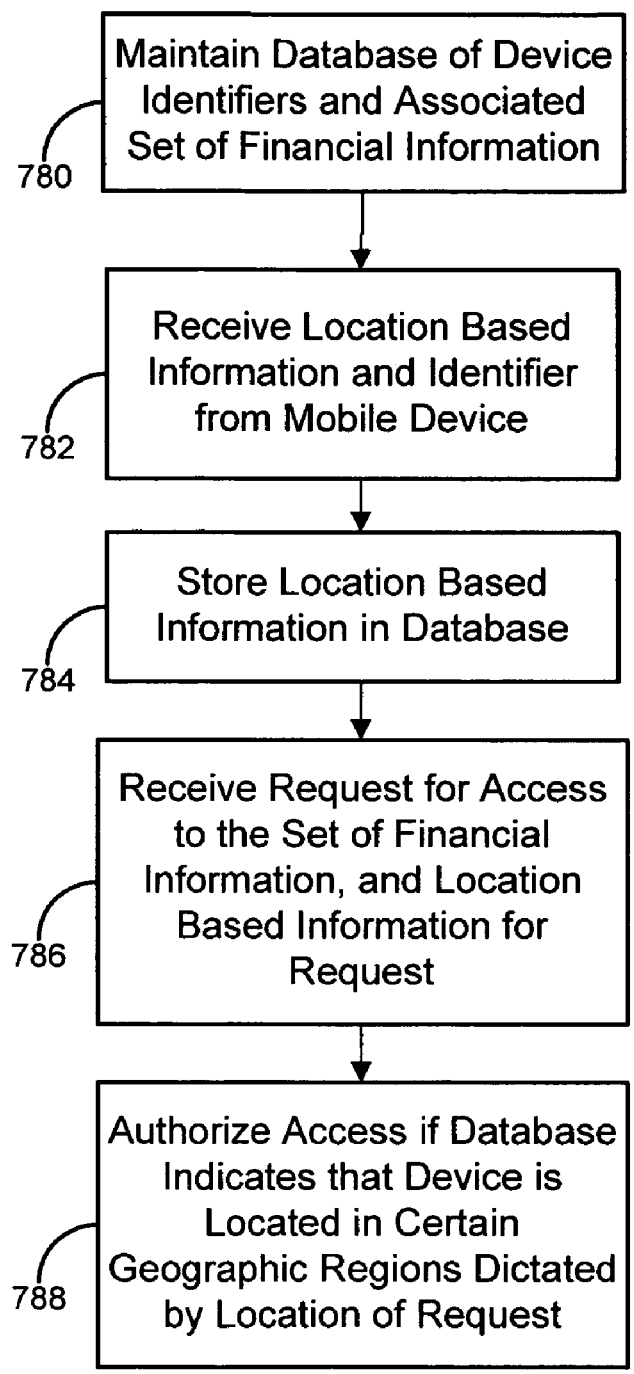
FIG. 7C is a flow diagram that illustrates a method that may be used to authorize a request to access financial information based on the location of a mobile communications device and the location of the transaction according to various embodiments of the present invention.

3. Method: Allow Access to Financial Information: Some embodiments of the invention comprise a method 775 for processing, on a server, a request to access financial information related to a mobile communications device, an example of which is illustrated in FIG. 7C. The following elements are for exemplary purposes only, and may be used interchangeably with elements described elsewhere. At block 780, a database is maintained, and an example of such a database is illustrated at 115 in FIG. 1. The database comprises a table of identifiers, each identifier unique to a mobile communications device, with each identifier associated with a different set of financial information.

At block 782, a communications signal from a mobile communications device is received, comprising a set of data identifying the location of the mobile device and the identifier unique to the mobile device. At block 784, the set of data identifying the location of the device is stored in the database. At block 786, a request to access a set of financial information is received, which is associated with the identifier unique to the mobile device, along with data identifying the location of the request. At block 788, the transaction is authorized if the Database indicates that the mobile device associated with the financial number is located within certain geographic regions which are determined, in part, by the location of the mobile device.

V. Emergency Services: Another set of embodiments of the invention provides systems and methods for contacting an appropriate emergency service provider and providing location based user information from a network connected device. The set of embodiments described above in II. Broad System Architecture may also enable a similar connection to an emergency services provider, but the following description further enables and modifies certain aspects of the invention. For example, the present embodiments may specifically provide user information based on the location of the device.

1. Overview: According to various embodiments of the invention, a system for contacting emergency services is described. The system may comprise a number of components, including a network connected device configured to receive a set of data identifying the location of the device. The network connected device may transmit a communications signal which includes information comprising the received location based data, an identifier unique to the device, and a request to contact emergency services.

In certain embodiments, the system includes a database which comprises a table of identifiers (including the identifier unique to the device), and each identifier is associated with different sets of user information stored in the database. Some of the user information may only be applicable to certain geographic regions. A location comparison server, in communication with the device and the database, may receive the communications signal, and identify a subset of the user information applicable to the location of the device and the identifier. The server may then transmit the request, the location of the device, and the subset to an emergency services provider determined by the location of the device.

Figure 8A:
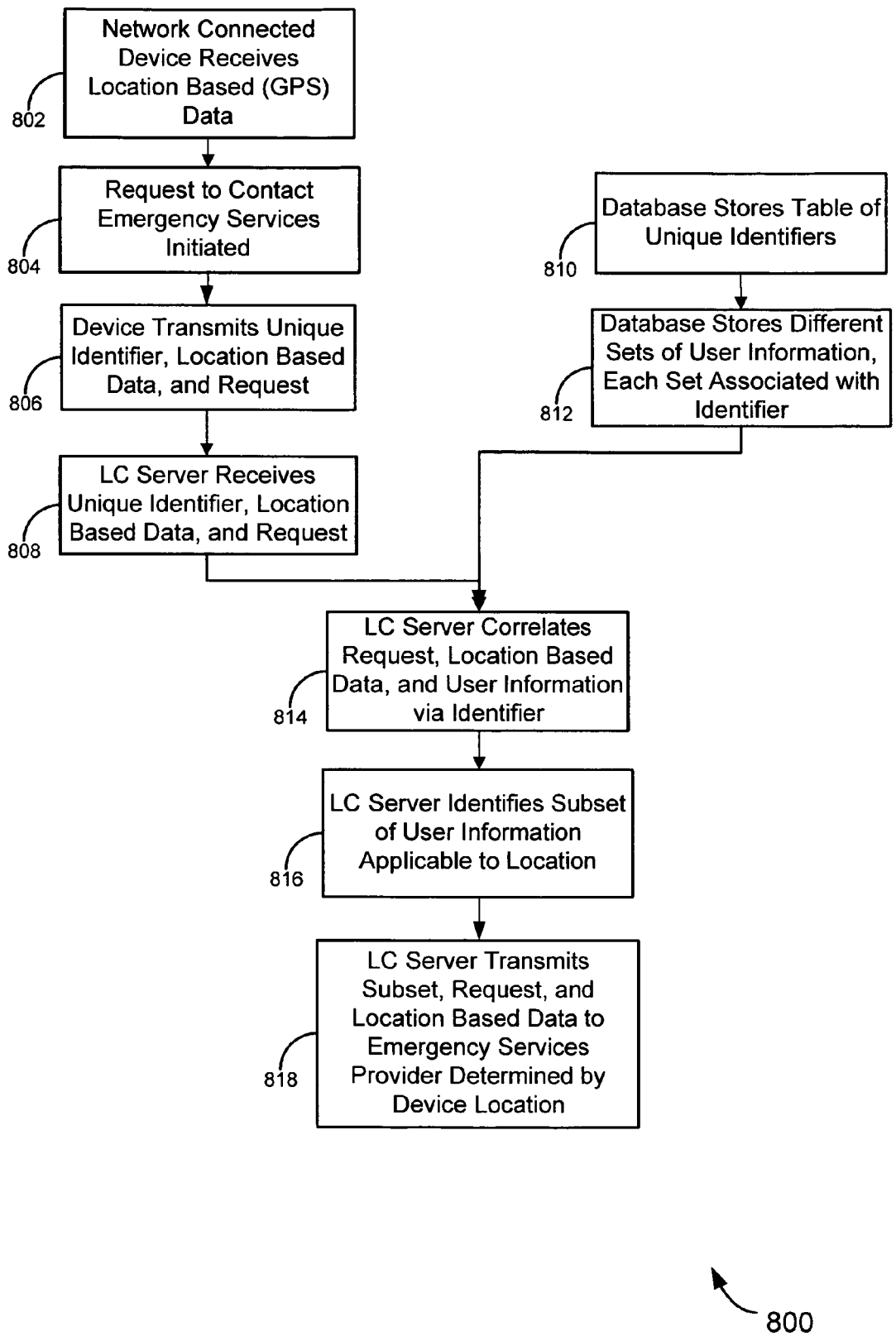
FIG. 8A is a flow diagram that illustrates a system that may be used for contacting emergency services based on the location of a network connected device according to various embodiments of the present invention.

2. Emergency Services Contact System: An exemplary embodiment of the system 800 is described in FIG. 8A. At block 802, the network connected device receives location based data which, in this embodiment, comprises GPS data. It is again worth noting that the network connected device may comprise any of the devices so described above (in Section II), including a mobile communications device. As noted, the device may be directly or indirectly coupled with a receiver component which enables the reception of location based information. The location based information may be received by hardware coupled to, with, or otherwise integrated into the device. In some embodiments, the hardware may include a USB or other connector to be removable from the device, and then coupled with another network connected device to provide similar functionality without reconfiguration of the hardware. The hardware may comprise a GPS receiver.

At block 804, a request to contact emergency services may be initiated from the device. In some embodiments, the network connected device may be coupled with a screen. The screen may contain a graphical representation of a button or other icon which initiates a request to contact emergency services. In some embodiments, the screen may be a touchscreen, or the button or icon may be selected with a mouse, keypad, keyboard, or other method. In some embodiments, the use of the button or other icon may require a confirmatory response. In other embodiments, the device may include a button, touchpad, or other one touch method to initiate a request, which may optionally require a confirmatory response.

At block 806, the device may transmit, in a communications signal: 1) an identifier unique to the device, 2) a set of data identifying the location of the device, and 3) a request to contact an emergency services provider. While the communications signal, location based data, and identifier unique to the device are described adequately above, the request may require further explanation. Such a request may comprise any amount of information related to a request for emergency services. For example, in the case that an "emergency" button is coupled with a device, the request may contain no specific information except that a person has pushed the emergency button. Alternatively, a request may include very specific information describing the need for emergency assistance (e.g., how many people may be hurt, what medical attention may be needed, image data of an accident, etc.). The data included in the request may, thus, comprise any type of data, including text and image data. An emergency services provider may comprise a local Public Service Answering Point ("PSAP") or other similar provider, an E911 control office, or a dispatcher for or other connection to a Hospital, Police Department, Fire Department, Ambulance Company or other emergency service provider. At block 808, the Location Comparison Server 110 may receive the 1) identifier unique to the device, 2) set of data identifying the location of the device, and 3) request to contact an emergency services provider. In different embodiments, the Server 110 may store any of this received information in an Emergency Services database ("ES database"). In some embodiments, this ES database may comprise, or be a subset of, the Database 115.

At any time before, or after, the device transmission, a table of unique identifiers may be stored in the ES Database, at block 810. Each identifier may be associated with a different device. At block 812, different sets of user information may be stored in the ES database, each set associated with one of the unique identifiers. Various parts of each set of user information may be associated with different geographic regions, as discussed in greater detail below.

User information may comprise a floor plan or other architectural diagram from a home, work, or other structure; a listing of persons living in the home; a listing of persons employed at work; a map of a geographic region for a work, home, or other location; a listing of medical conditions; a listing of allergies; a listing of medications; contact information for a doctor or other medical professional; a listing of emergency contacts; personal information (name, home address, work address, age, gender, height, weight, additional description); special medical directions; any other related information; and any part or combination thereof. As is evident from the description of the user information, some of the user information is location dependent. Therefore, in certain embodiments, parts of a set of user information may be associated with different geographic regions. When a device requests emergency services from certain locations, the locations of the device may be compared to the geographic regions to determine which parts of the user information are relevant, given the location of the device. By way of example, a map of the geographic region around work and the floor plan at work might only be transmitted if a user is within 100 meters of work. As evident to those skilled in the art, there are a number of ways to associate the location of the device with location specific user information.

In some embodiments, the user information may be modified by a user associated with the user information from the network connected device. In other embodiments, the information may be modified by a medical professional, a communications service provider, or other entity, and such modifications may be made via a web interface or other connection. The applicable geographic regions may be similarly modified.

FIG. 8B shows a table 825, provided for exemplary purposes only, illustrating how the ES database content may be structured according to certain embodiments of the invention. Certain contents of the table 825 described below may, or may not, be stored in the ES database and, instead, may be stored elsewhere on a temporary or more permanent basis. The ES database may comprise a table of identifiers 832, each identifier unique to a device 830. Each identifier and device in the table may also be associated with a set of user information 834, as described above (e.g., Device$_1$ is associated with User Information$(X)_{1A, 1B, 1C, 1D}$, Device$_2$ is associated with User Information$(X)_{2A, 2B, 2C, 2D}$, etc.). The user information may also be associated with limited (or unlimited) geographic regions, which may indicate a limited area in which the particular piece of user information is relevant (e.g., User Information$(X)_{1A}$ applicable in Geographic Region$(X)_{1A}$, User Information$(X)_{1B}$ applicable in Geographic Region$(X)_{1B}$, etc.). In some embodiments, for a given device, the applicable user information 834 to be transmitted may be determined by the correlating 838 the associated geographic region 836 and the current location 840 of the device. In other embodiments, different comparisons 838 between the current location 840 of a device and geographic regions 836 may be made to determine the subset of user information 834 to be transmitted.

The specific manner in which a given geographic region may be determined may be incorporated in a rule, within an Application of the Server 110, or otherwise embodied on a computer-readable medium. In another embodiment, the database may comprise additional rules dictating how to determine the geographic regions, as described throughout this detailed description.

Returning now to FIG. 8A, at block 814, the Location Comparison Server 110 may bring the data together by correlating, via the common identifier, 1) the request for emergency services and location based data from the device, and 2) the user information. At block 816, the Server 110 may identify a subset of the user information applicable to the location of the device, as described above. At block 818, the Server 110 may transmit the subset of user information, the request, and the location based data for the device to an emergency services provider determined by the location of the device. The appropriate local emergency services provider may be determined by using the location based data for the device to determine the provider serving that area. E911 provides an exemplary system for such switching with its E911 control office, as the office functions as a selective router to route cellular calls to the appropriate local PSAP. One skilled in the art may easily adapt this, or other related technology, to provide similar routing capability for the present invention. The transmission may be directed to reach the appropriate local emergency services provider directly, or indirectly.

According to some embodiments, the Location Comparison Server 110 may establish a connection with the emergency services provider via a Network 125. Because the Server 110 may also be connected with the network connected device, this may allow the establishment of a communications link between the network connected device and the emergency services provider via the Server 110. Those skilled in the art will recognize the various types of connections that may be created with such a link. For example, the communications link may provide for two-way communication (e.g., telephone call, voice call, video call, text messaging, other two way messaging). One-way communications (e.g., e-mail, voice mail) may also be established.

In other embodiments, after a Server 110 has transmitted a request to an emergency services provider, the Server may continue to receive updated sets of data identifying the location of the device. Having specifically described the system, it will be apparent to one skilled in the art the variety of methods that may be used in conjunction with the system. One such exemplary method is described below. The method can be used in a variety of systems, and other methods can be used as well, as will be apparent to one skilled in the art in light of this disclosure.

Figure 8C:
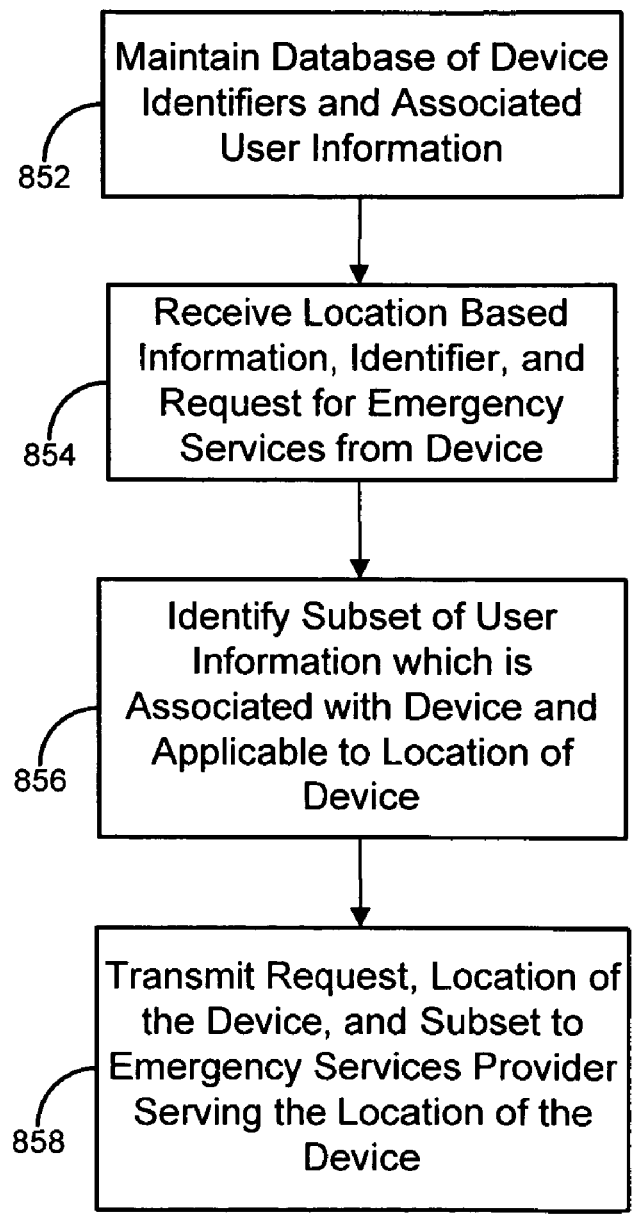
FIG. 8C is a flow diagram that illustrates a method that may be used to provide for the contact with emergency services according to various embodiments of the present invention.

3. Method for Contacting Emergency Service Provider: Certain embodiments of the invention comprise a method 850 for facilitating a request to contact an emergency services provider, via a server, from a network connected device. An example of such a method is illustrated in FIG. 8C. The following elements are for exemplary purposes only, and may be used interchangeably with elements described elsewhere. At block 852, a database is maintained, and an example of such a database is illustrated at 115 in FIG. 1. The database comprises a table of identifiers, each identifier unique to a network connected device, with each identifier associated with a different set of user information.

At block 854, a communications signal from a network connected device may be received, comprising a set of data identifying the location of the device and the identifier unique to the device, along with a request for emergency services. At block 856, a subset of user information is identified, the subset being applicable to the location of the device and selected from the associated set of user information. At block 858, the request, location of the device, and subset of user information may be transmitted to an emergency services provider serving the region in which the device is located.

VI. Avoiding Unwanted Communications: Yet another set of embodiments of the invention provides systems and methods for avoiding unwanted communications from a network connected device. The set of embodiments described above in II. Broad System Architecture may also provide for the ability to apply filtering rules to electronic messages, but the following description further enables and modifies certain aspects of the invention. For example, the present embodiments may specifically provide receiver-specific filtering rules based on the location of the sender.

1. Overview: In various embodiments of the invention, a system for receivers of electronic messages to avoid unwanted electronic communications is described. The system may comprise any number of network connected devices, which are the senders of the electronic messages. In some embodiments, one such network connected device is configured to receive a set of data identifying the location of the device. That device may transmit a communications signal, which comprises the received location based data and an electronic message directed at a receiver of electronic messages.

In certain embodiments, the system includes a database which comprises a table of receivers (including the receiver to which the message is directed). Each receiver is associated with a different set of filtering rules, each rule dictating how to filter an electronic message sent from a specific geographic region. A location comparison server, in communication with the device and the database, may receive the location based data from the sender, and an identification of the receiver to which the message is directed. The location comparison server may then select a filtering rule applicable to the identified receiver and the geographic region from which the message was sent. Thus, receivers may block or otherwise filter messages from locations which may originate unwanted communications.

Figure 9A:
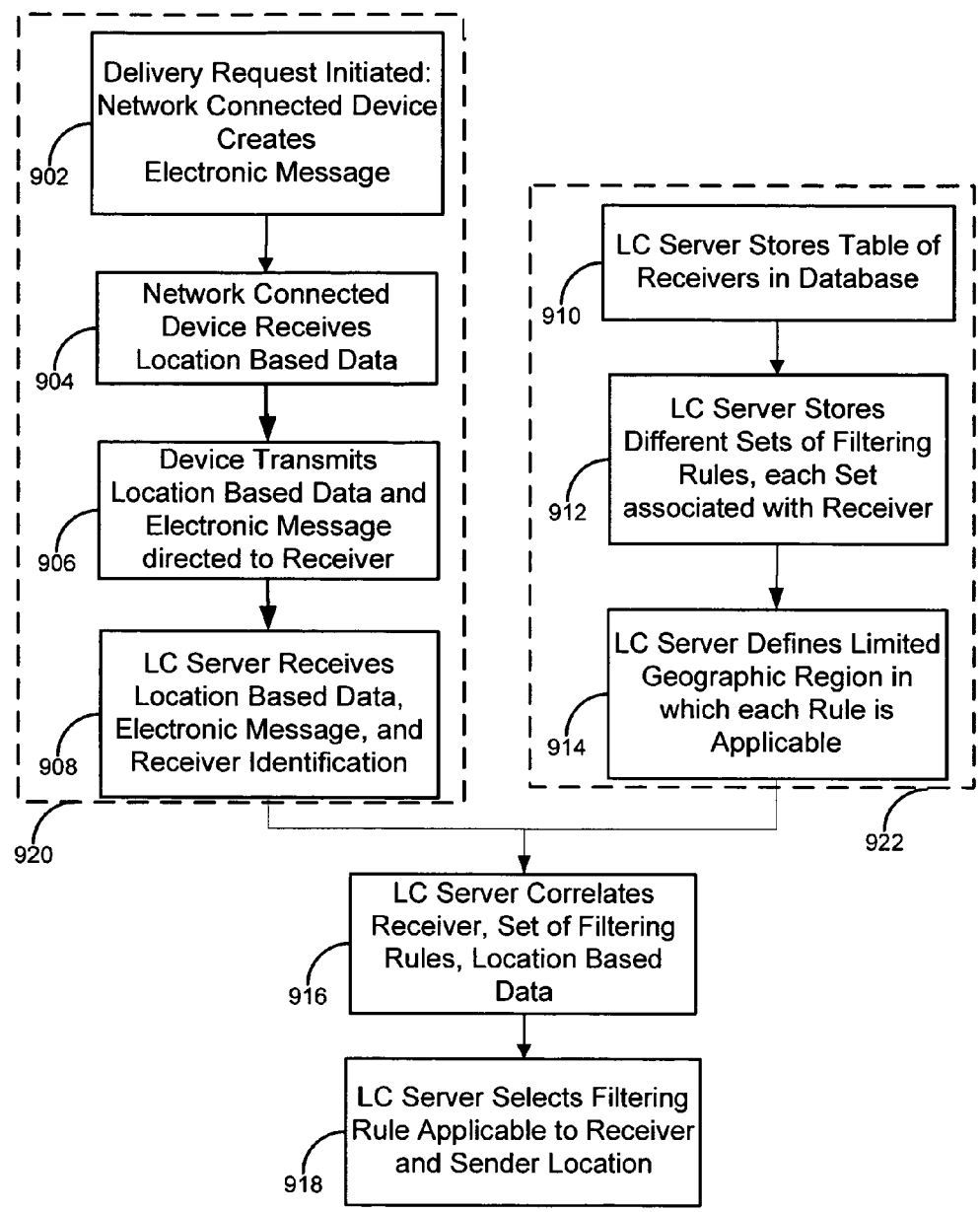
FIG. 9A is a flow diagram that illustrates a system that allows a plurality of receivers to filter electronic messages based on the location of the sending device according to various embodiments of the present invention.

2. System to Filter Unwanted Communications Based on Location: An exemplary embodiment of the system 900 is described in FIG. 9A. The individual elements may be rearranged, and need not occur in the following order, which is for purposes of example only. At block 902, a network connected device may initiate a request to deliver an electronic message by creating a message. This first network connected device may be referred to hereinafter as the "sender." An electronic message, as that term is used herein, may comprise an e-mail, a text message, a control message, a packet, an electronic message comprising data, text, image, audio, or any combination thereof, or any electronic communication directed to be delivered to a specific device, series of devices, or other electronic address (such as an IP address). An electronic message need not contain any specific amount of information. It is again worth noting that the network connected device may comprise any of the devices so described above (in Section II), including devices as varied as a mobile communications device or an e-mail server.

At block 904, the network connected device may receive a set of data identifying its location. As noted, the network connected device (i.e., sender) may be directly or indirectly coupled with a receiver component which enables the reception of location based information, such as a GPS receiver. The location based information may be received by hardware coupled to, with, or otherwise integrated into the device. In certain embodiments, there is an authentication mechanism or other procedure, configured in hardware or software, to ensure that the electronic message has originated or is otherwise associated with valid location based data. Those skilled in the art will recognize the variety of options to ensure validity, authentic location based data is linked to the electronic message.

At block 906, the device may transmit, in a communications signal: 1) the set of data identifying the location of the device, and 2) the electronic message, directed to a specific receiver. This transmission may comprise a delivery request. While the communications signal, location based data, and electronic message are described adequately above, the term "receiver" may require further explanation. A receiver may comprise a second network connected device that is configured to receive an electronic message. While many such devices may include an IP address or an IM address, and may often be delivered over a Network 125, any addressing scheme or electronic delivery system may suffice. For example, a receiver may comprise a recipient within a proprietary electronic message delivery system. As is known in the art, such proprietary systems are widely available on a commercial basis. It is anticipated that electronic messaging systems will continue to evolve, and that the term receiver may comprise any second network connected device configured to receive an electronic message.

At block 908, the Location Comparison Server 110 may receive the 1) set of data identifying the location of the sender, and 2) an identification of the receiver to which the electronic message is directed. The Server may also receive the contents of the message, or any communications signal, packet or set of packets which together comprise "the electronic message, directed to a specific receiver" transmitted by the sender. However, in various embodiments, the Server 110 may simply receive an identification of the receiver without any additional content. This may allow, for example, an e-mail server (or other intermediary) to query the Location Comparison Server 110 without sending the contents of the message. The identification may comprise an e-mail address, an IM address, an identifier unique to a receiver (as described elsewhere in this Application), or any address or other identifier which provides for delivery of an electronic message to the receiver. In different embodiments, the Server 110 may store any of this received information in an Unwanted Messaging database ("UM database"). In some embodiments, this UM database may comprise, or be a subset of, the Database 115.

At any time before, or after, the device transmission, a table of receivers (including the receiver to which the message is directed) may be stored in the UM Database, at block 910. At block 912, different sets of filtering rules may be stored in the UM database, each set associated with one of the receivers. A filtering rule may comprise a rule, as that term is used elsewhere in this application. Various rules of each set of filtering rules may be associated with different geographic regions, as discussed in greater detail below.

Filtering rules may comprise allowing, blocking, or forwarding delivery of an electronic message, or any other similar filtering or screening process. For example, one rule may specify that the message should be forwarded to another server for preemptive e-mail protection. Any combination of anti SPAM, SPIM, SPIT, virus and phishing services may comprise a filtering rule. Attachment or content filtering may also comprise a filtering rule. For example, downloading of "adult" content may be limited for specified receivers in regions around schools, daycare centers, workplaces, etc. Other exemplary filtering rules may comprise requesting more information from the sender, requiring registration from the sender, or asking the receiver of the electronic message what action to take with the message. Yet another filtering rule may comprise a message to the sender that a fee must be paid for the delivery of the message, and an optional description or procedure for such payment. Those skilled in the art will recognize the wide variety of filtering and screening rules that may be implemented, either alone or in combination.

At block 914, a Location Comparison Server 110 may define limited (or unlimited) geographic regions in which a filtering rule is applicable by associating rules with different geographic regions. For example, if a receiver was receiving a significant amount of SPAM from a certain location or region, a block filtering rule may be applied to that location or region. Alternatively, an allow filtering rule may be applied for regions associated with friends, work, clients, etc. Other filtering rules, of varying granularity, may be applied if the regions are less known.

In some embodiments, filtering rules may be modified by a user of the receiver associated with the set of filtering rules. The modification may be made from the receiver, or from another device via a web interface or otherwise over a Network 135. In other embodiments, the information may be modified by a communications service provider, a preemptive e-mail protection service, or other entity, and such modifications may be made via a web interface or other connection. The applicable geographic regions may be similarly modified.

FIG. 9B shows a table 925, provided for exemplary purposes only, illustrating how the UM database content may be structured according to certain embodiments of the invention. Contents of the table 925 described below may, or may not, be stored in the UM database and, instead, may be stored elsewhere. The UM database may comprise a table of receivers 930. The table shows a column 932 to illustrate how a delivery request is associated with a receiver. Such a delivery request may comprise an action request, as that term is used elsewhere. Each receiver in the table may also be associated with a set of filtering rules 934, as described above (e.g., Receiver$_1$ is associated with Rules(X)$_{1i, 1ii, 1iii, 1iv}$, Receiver$_2$ is associated with Rules(X)$_{2i, 2ii, 2iii, 2iv}$, etc.). Each filtering rule may also be associated with limited (or unlimited) geographic regions 936, which may indicate a limited sending area in which the filtering rule may be applied for a receiver (e.g., Rule(X)$_{1i}$ applicable in Geographic Region(X)$_{1i}$, Rule(X)$_{1ii}$ applicable in Geographic Region(X)$_{1ii}$, etc.). In some embodiments, for a given device, the applicable filtering rule 934 to be selected may be determined by the correlating 938 the associated geographic region 936 and the location 940 from which the electronic message was sent. In other embodiments, different comparisons 938 between the location 940 of a sender and geographic regions 936 may be made to determine the subset of user information 934 to be transmitted.

The specific manner in which a given geographic region may be determined may be incorporated in a rule, within an Application of the Server 110, or otherwise embodied on a computer-readable medium. In another embodiment, the database may comprise additional rules dictating how to determine the geographic regions, as described throughout this detailed description. In some embodiments, a geographic region may be a specific location. In various embodiments, the boundaries of a geographic region are determined automatically by the Location Comparison Server 110, wherein the Server 110 establishes the boundaries based on information on unwanted communications received from the plurality of receivers.

Returning now to FIG. 9A, at block 916, the Location Comparison Server 110 may bring the data together by correlating, via the receiver identification, 1) the set of filtering rules, and 2) the location based data from the sender. At block 918, the Server 110 may select the filtering rule applicable to the location of the sender, as described above. In some embodiments, the Server 110 may perform the selected filtering rule. Also, the Server 110 may store the selected filtering rules, any data associated with the selection, in the UM database or other database. In some embodiments, the Server 110 may select the boundaries of one or more of the geographic regions based, in part, on the past selected filtering rules stored in the UM database. In some embodiments, the dashed region denoted by reference numeral 920 may comprise the data created by the sending device, whereas the dashed region denoted by reference numeral 922 may comprise the filtering rules stored in the UM database. The Location Comparison Server 110 may correlate the information received from the sender 920 and the information in the UM database 922 to select the applicable filtering rule.

Figure 9C:
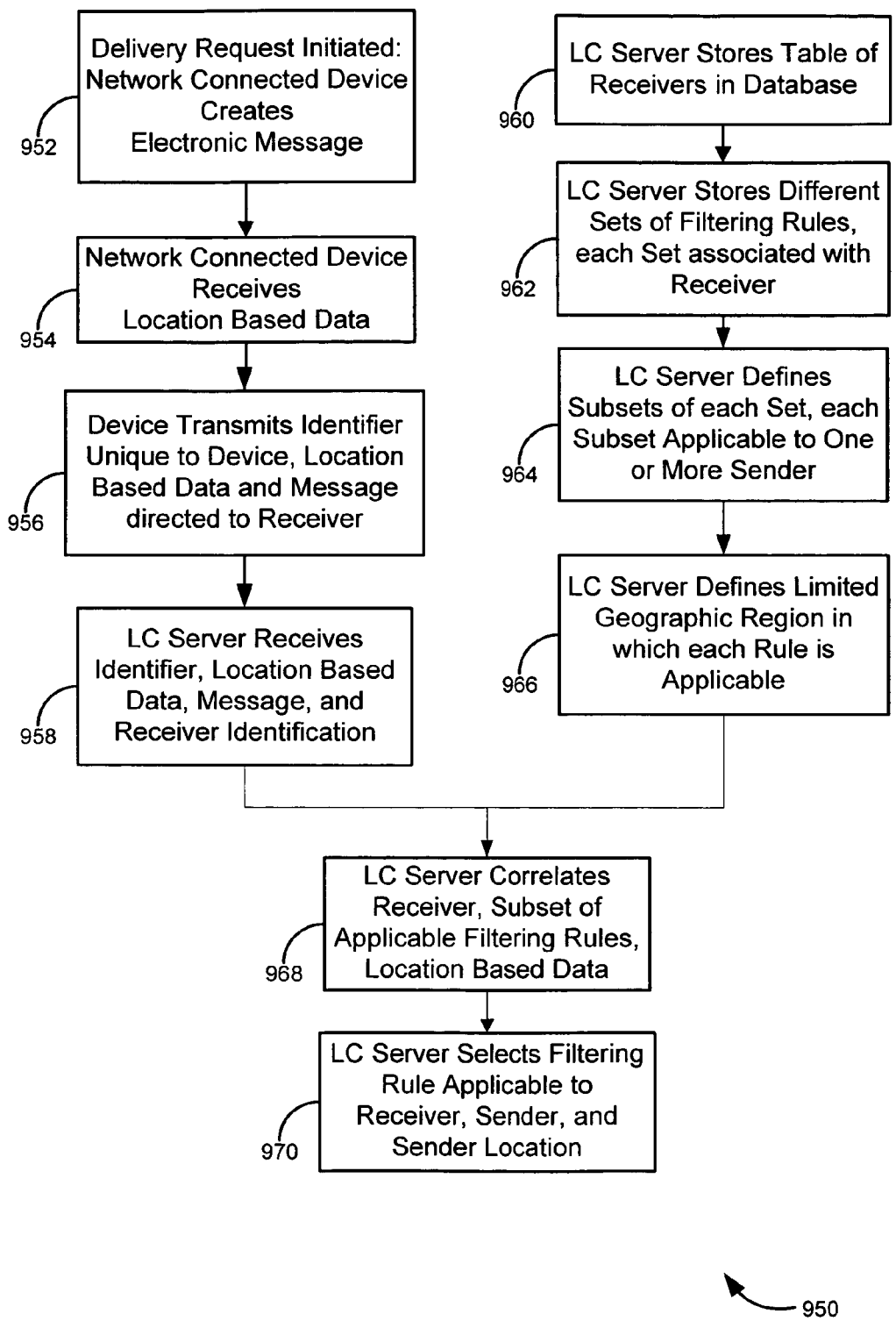
FIG. 9C is a flow diagram that illustrates a system that allows each of a plurality of receivers to filter electronic messages based on the location and identification of the sending device according to various embodiments of the present invention.

3. System to Filter Unwanted Communications Based on Location and Identifier: According to various embodiments of the invention, the filtering rules specified above may also be limited in applicability to only certain senders. The following discussion describes an exemplary embodiment 950, illustrated in FIG. 9C, to show how such functionality may be implemented. A delivery request may also be associated with an identifier unique to the sender (e.g., an identifier unique to the device sending the electronic message, or an identifier unique to the sender associated with the device (such as an e-mail or IM address)). The same alternative elements described above in Section VI. 2. may be applicable to the following set of embodiments and, thus, the discussion will be focused on the differences.

At block 952, a network connected device ("sender") may initiate a request to deliver an electronic message by creating a message. At block 954, the network connected device may receive a set of data identifying its location. At block 956, the device may transmit, in a communications signal: 1) the set of data identifying the location of the device, 2) an identifier unique to the sender and 3) the electronic message, directed to a specific receiver. This transmission may comprise a delivery request. At block 958, the Location Comparison Server 110 may receive, at least, the 1) set of data identifying the location of the sender, 2) an identifier unique to the sender, and 3) an identification of the receiver to which the electronic message is directed.

At block 960, a table of receivers (including the receiver to which the message is directed) may be stored in the UM Database. At block 962, different sets of filtering rules may be stored in the UM database, each set associated with one of the receivers. Subsets of each set of filtering rules may apply only to certain senders. In some embodiments, each filtering rule may be applied only to a certain sender or group of senders. However, it is anticipated that it may be optimal in many circumstances for a receiver to have some universal filtering rules applicable to all senders. At block 964, the Server 110 may define the subsets of each set of rules with are applicable only to a specified sender. However, those skilled in the art will recognize that there are many different ways in which the subsets may be selected. For instance, a receiver or service provider may make such determinations, and such limitations may be implemented or stored in the database in a variety of ways known in the art. In limiting the applicability of a rule to a certain sender, a sender may be specified by using an identifier unique to the sender.

At block 966, a Location Comparison Server 110 may define limited (or unlimited) geographic regions in which each filtering rule is applicable by associating rules with different geographic regions. Because a filtering rule may in some embodiments only apply to a certain sender, filter granularity of location and sender may be combined.

FIG. 9D shows a table 975, illustrating how the UM database content may be structured according to certain embodiments of the invention, in a manner different than table 925. Contents of the table 975 described below may, or may not, be stored in the UM database. The UM database may comprise a table of receivers 976 who are intended recipients of delivery requests 978 (which include the identifier of a sender, noted as A, B, or C in the table 975). Each receiver in the table may also be associated with a set of filtering rules 980, as described above (e.g., Receiver$_1$ is associated with Rules(X)$_{1Ai,\ 1Aii,\ 1Aiii,\ 1Bi,\ 1Bii}$, Receiver$_2$ is associated with Rules(X)$_{2Ai,\ 2Aii,\ 2Aiii,\ 2Bi,\ 2Bii,\ 2Biii,\ 2Biv}$, etc.). Each filtering rule may also be associated with only certain senders (e.g., Rules(X)$_{1Ai,\ 1Aii,\ 1Aiii}$ only applicable to sender A, Rules(X)$_{1Bi,\ 1Bii}$ only applicable to sender B, etc.). As above, each filtering rule may also be associated with limited (or unlimited) geographic regions 982, which may indicate a limited sending area in which the filtering rule may be applied for a receiver (e.g., Rule(X)$_{1Ai}$ applicable only in Geographic Region(X)$_{1Ai}$, Rule(X)$_{4Cii}$ applicable only in Geographic Region(X)$_{4Cii}$, etc.). In some embodiments, for a given device, the applicable filtering rule 980 to be selected may be determined by correlating 984 the associated geographic region 982 and the location 986 from which the electronic message was sent (from the set of filtering rules applicable to the sender and receiver). In other embodiments, different comparisons 984 between the location 986 of a sender and geographic regions 982 may be made to determine the rule 980 to be selected.

Returning now to FIG. 9C, at block 968, the data may be brought together by correlating, via the receiver identification, 1) the subset of filtering rules applicable to the sender, and 2) the location based data from the sender. At block 970, the Server 110 may select the filtering rule applicable to the location of the sender, as described above. Having specifically described the system, it will be apparent to one skilled in the art the variety of methods that may be used in conjunction with the system. One such exemplary method is described below. The method can be used in a variety of systems, and other methods can be used as well, as will be apparent to one skilled in the art in light of this disclosure.

Figure 9E:
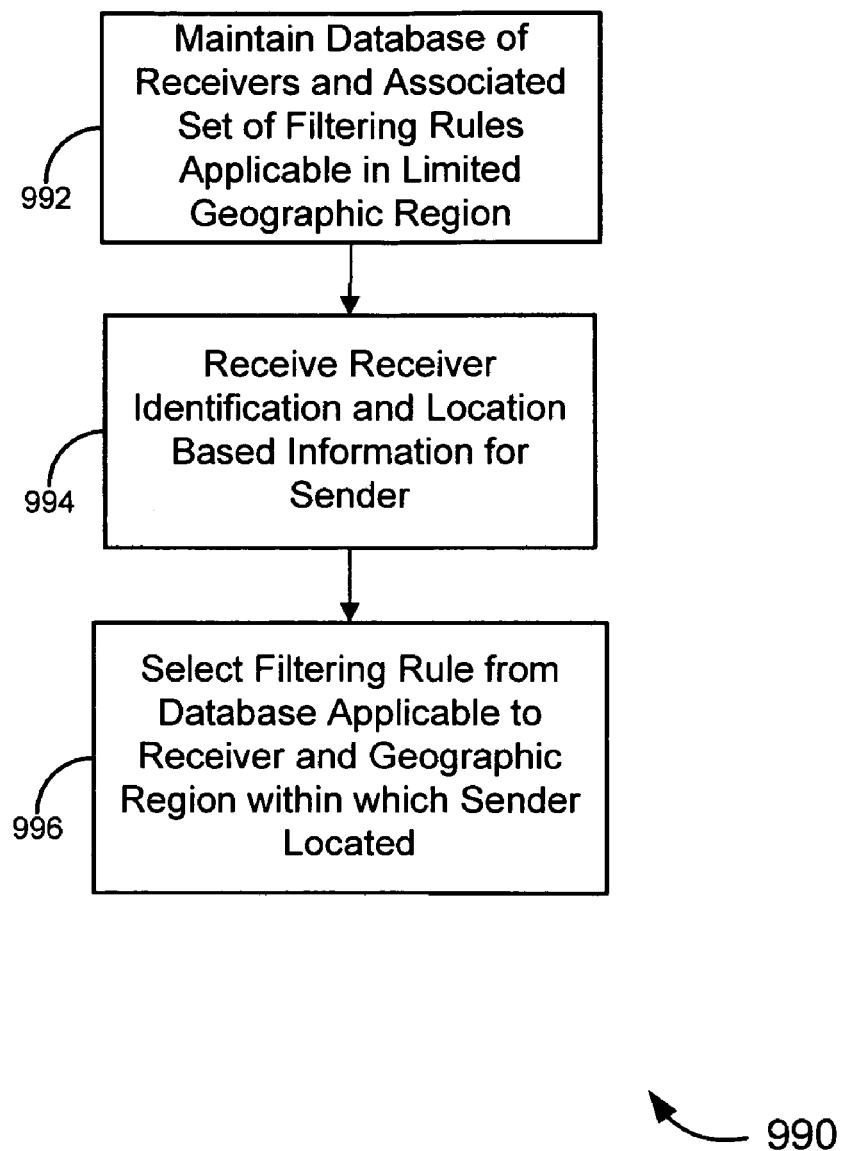
FIG. 9E is a flow diagram that illustrates a method that may be used to filter electronic messages to each of a plurality of receivers according to various embodiments of the present invention.

4. Method for Filtering Unwanted Communications: Certain embodiments of the invention comprise a method 990 for a plurality of receivers of electronic messages to avoid unwanted electronic communications. An example of such a method is illustrated in FIG. 9E. The following elements are for exemplary purposes only, and may be used interchangeably with elements described elsewhere. At block 992, a database is maintained, and an example of such a database is illustrated at 115 in FIG. 1. The database may comprise a table of receivers, with each receiver associated with different filtering rules which are each applicable in a limited geographic region.

At block 994, a communications signal from a network connected device may be received, comprising a set of data identifying the location of the device and an identification of the receiver. At block 996, a filtering rule is selected from the database, the rule being applicable to the receiver and the geographic region within which the sender is located.

Figure 10:
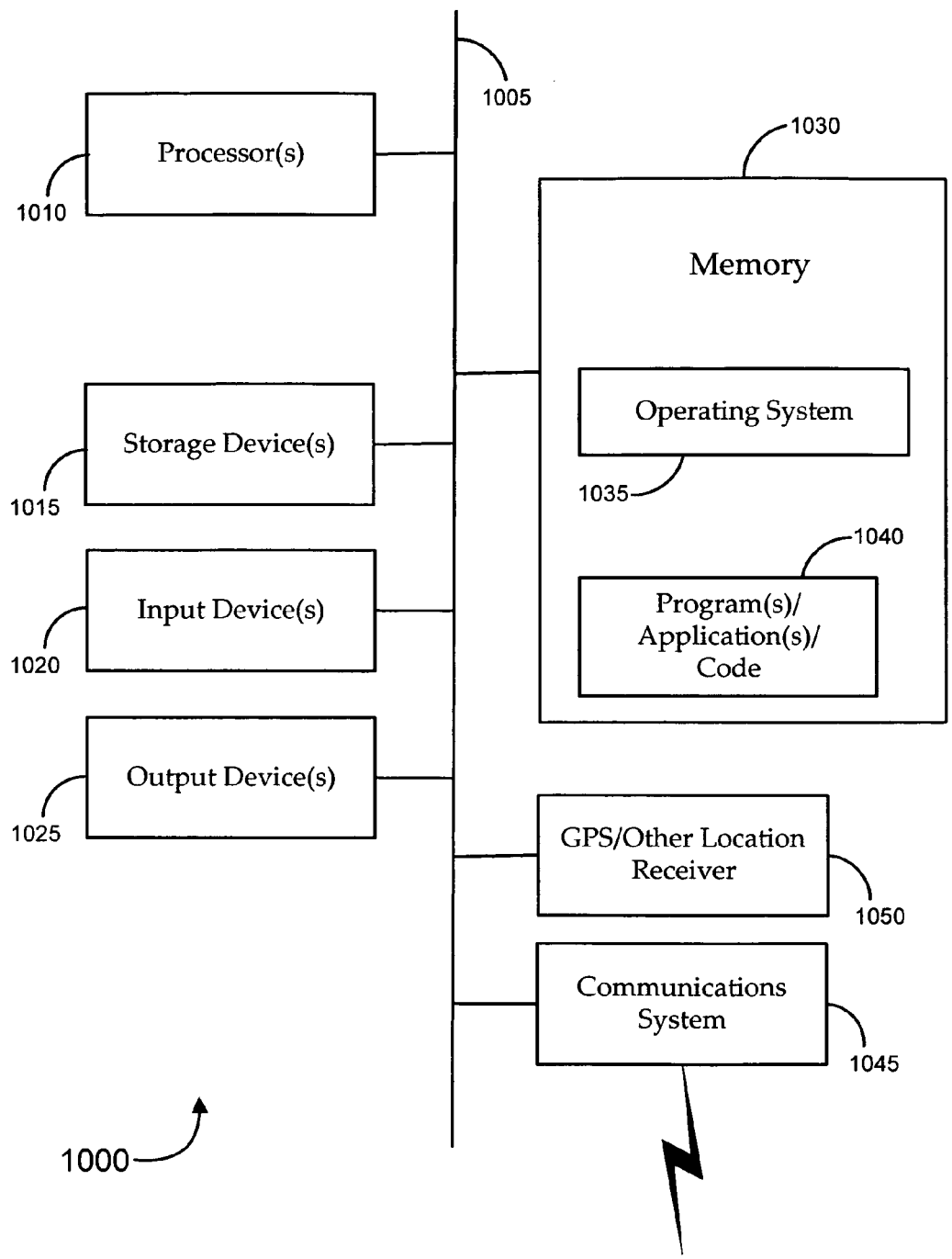
FIG. 10 is a schematic diagram that illustrates a representative device structure that may be used in various embodiments of the present invention.

VII. Computing Device Structure: A device structure 1000 that may be used for any network connected device, mobile communications device, Location Comparison Server 110, Action Request Originator 120, or any other computing device described herein is illustrated with the schematic diagram of FIG. 10. This drawing broadly illustrates how individual system elements of each of the aforementioned devices may be implemented, whether in a separated or more integrated manner. The exemplary structure is shown comprised of hardware elements that are electrically coupled via bus 1005, including processor(s) 1010 (which may further comprise a DSP or special-purpose processor), storage device(s) 1015, input device(s) 1020, and output device(s) 1025. The storage device(s) 1015 may comprise a computer-readable storage media reader connected to any computer-readable storage medium, the combination comprehensively representing remote, local, fixed, or removable storage devices or storage media for temporarily or more permanently containing computer-readable information. The GPS/Other Location Receiver 1050 may comprise any such receiver, whether separate or more integrated, that is configured to receive location based data as described herein. The communications system 1045 may comprise a wired, wireless, or other type of interfacing connection that permits data to be exchanged with other devices. The communications system(s) 1045 may permit data to be exchanged with a network (including, without limitation, the Network 125).

The structure 1000 may also comprise additional software elements, shown as being currently located within working memory 1030, including an operating system 1035 and other code 1040, such as programs or applications designed to implement methods of the invention. It will be apparent to those skilled in the art that substantial variations may be used in accordance with specific requirements. For example, customized hardware might also be used, or particular elements might be implemented in hardware, software (including portable software, such as applets), or both.

VIII. CONCLUSION

It should be noted that the methods, systems and devices discussed above are intended merely to be exemplary in nature. It must be stressed that various embodiments may omit, substitute, or add various procedures or components as appropriate. For instance, it should be appreciated that in alternative embodiments, the methods may be performed in an order different than that described, and that various steps may be added, omitted or combined. Also, features described with respect to certain embodiments may be combined in various other embodiments. Different aspects and elements of the embodiments may be combined in a similar manner. For example, while it has been emphasized that the systems and methods described in the II. Broad System Architecture section, are applicable throughout, elements of the embodiments of each section may be combined, or otherwise used for differentiation. Also, it should be emphasized that technology evolves and, thus, many of the elements are exemplary in nature and should not be interpreted to limit the scope of the invention.

It should be noted that the methods, systems and devices discussed above are intended merely to be exemplary in nature. Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments. Also, it is worth noting that technology evolves, and that terms should be interpreted accordingly.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure.

Moreover, as disclosed herein, the terms "storage medium" or "storage device" may represent one or more devices for storing data, including read only memory (ROM), random access memory (RAM), magnetic RAM, core memory, magnetic disk storage mediums, optical storage mediums, flash memory devices or other machine readable mediums for storing information. The term "computer-readable medium" includes, but is not limited to, portable or fixed storage devices, optical storage devices, wireless channels, a sim card, other smart cards, and various other mediums capable of storing, containing or carrying instructions or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as a storage medium. Processors may perform the necessary tasks.

Having described several embodiments, it will be recognized by those of skill in the art that various modifications, alternative constructions, and equivalents may be used without departing from the spirit of the invention. For example, the above rules may merely be a component of a larger system, wherein other rules may take precedence over or otherwise modify the application of the rules. Also, a number of steps may be required before the above rules are considered. By way of example, with a financial transaction, other preventative measures and authorizations may be used in conjunction with or apart from the rules providing for authorization of a financial transaction. Accordingly, the above description should not be taken as limiting the scope of the invention, which is defined in the following claims.

What is claimed is:

1. A system for a plurality of receivers of electronic messages to avoid unwanted electronic communications, the system comprising:
a network connected device, wherein the device is configured to:
receive a set of data identifying the location of the device; and
transmit a communications signal comprising the set of data and an electronic message directed to one of the plurality of receivers; and
a database which comprises:
a table comprising the plurality of receivers; and
a plurality of filtering rules, each filtering rule dictating how to filter electronic messages originating in one or more of a plurality of geographic regions,
wherein each of the plurality of receivers in the table is associated with one or more of the plurality of filtering rules;
a location comparison server, in communication with the device and the database, wherein the server is configured to:
receive information comprising the set of data and an identification of the one of the plurality of receivers where the electronic message is directed;
select a filtering rule from the plurality of filtering rules, wherein the selected filtering rule applies to the one of the plurality of receivers and to a geographic region within which the device is located.

2. The system of claim 1, wherein,
the communications signal further comprises an identifier, wherein the identifier is unique to a sender of the electronic message or unique to the network connected device;
a subset of the plurality of filtering rules applies only to the identifier; and
the select step further comprises selecting the filtering rule wherein the selected filtering rule applies to the identifier.

3. The system of claim 2, wherein,
the database further comprises a plurality of identifiers;
the one or more of the plurality of filtering rules associated with each of the plurality of receivers are each applicable to a subset of the plurality of identifiers.

4. The system of claim 1, wherein the network connected device comprises a mobile communications device.

5. The system of claim 1, wherein the set of data is received by hardware configured to receive the set of data, the hardware coupled with the device.

6. The system of claim 5, wherein the hardware configured to receive the set of data comprises a GPS receiver.

7. The system of claim 1, wherein the identifier unique to the device is selected from the group consisting of: a MAC address, an IP address, a telephone number, and any combination thereof.

8. The system of claim 1, wherein at least one of the plurality of geographic regions comprise a specific location.

9. The system of claim 1, wherein the selected filtering rule comprises blocking delivery of the electronic message.

10. The system of claim 1, wherein the selected filtering rule comprises allowing delivery of the electronic message.

11. The system of claim 1, wherein the selected filtering rule comprises forwarding the electronic message to other than the one of the plurality of receivers.

12. The system of claim 1, wherein the selected filtering rule comprises sending a message to the network connected device comprising notice that a fee must be paid for delivery of the electronic message.

13. The system of claim 1, wherein the selected filtering rule is stored in the database.

14. The system of claim 1, wherein,
boundaries of the plurality of geographic regions are established automatically by the server; and the server establishes the boundaries based on information on unwanted communications and their originating locations received from the plurality of receivers.

15. The system of claim 1, wherein a boundary of at least one of the plurality of geographic regions is selected by the user of one of the plurality of receivers.

16. The system of claim 15, wherein the electronic message is blocked because the device is located in the at least one of the plurality of geographic regions.

17. The system of claim 16, wherein the at least one of the plurality of geographic regions comprises a specific location.

18. The system of claim 1, wherein,
past selected filtering rules are stored in the database; and
boundaries of one or more of the plurality of geographic regions are selected based the past selected filtering rules stored in the database.

19. The system of claim 1, wherein the network connected device is further configured to provide verification that the electronic message is transmitted from the location of the device.

20. The system of claim 1, wherein the communications signal comprises one or more signals, each signal transmitted at different times.

21. A method for a plurality of receivers of electronic messages to avoid unwanted electronic communications, the method comprising:
maintaining a database which comprises:
a table comprising the plurality of receivers; and
a plurality of filtering rules, each filtering rule dictating how to filter an electronic message originating in one of a plurality of geographic regions,
wherein each of the plurality of receivers is associated with one or more of the plurality of filtering rules;
receiving a communications signal including information comprising a set of identifying the location of a network connected device and one of the plurality of receivers where an electronic message is directed;
selecting a filtering rule from the plurality of filtering rules, wherein the filtering rule applies to the one of the plurality of receivers and to a geographic region within which the device is located.

22. The method of claim 21, wherein,
the communications signal further comprises an identifier, wherein the identifier is unique to a sender of the electronic message or unique to the network connected device;
a subset of the plurality of filtering rules applies only to the identifier; and
the select step further comprises selecting the filtering rule wherein the selected filtering rule applies to the identifier.

23. The method of claim 22, wherein,
the database further comprises a plurality of identifiers;
the one or more of the plurality of filtering rules associated with each of the plurality of receivers is applicable to a subset of the plurality of identifiers.

24. A computer program embodied on at least one computer readable storage medium, the computer program comprising instructions executable by a computer to:
maintain a database which comprises:
a table comprising the plurality of receivers; and
a plurality of filtering rules, each filtering rule dictating how to filter an electronic message originating in one of a plurality of geographic regions,
wherein each of the plurality of receivers is associated with one or more of the plurality of filtering rules;
receive a communications signal including information comprising a set of identifying the location of a network connected device and one of the plurality of receivers where an electronic message is directed;
select a filtering rule from the plurality of filtering rules, wherein the selected filtering rule applies to the one of the plurality of receivers and to a geographic region within which the device is located.

* * * * *